(12) United States Patent
Ikeuchi et al.

(10) Patent No.: US 8,323,222 B2
(45) Date of Patent: Dec. 4, 2012

(54) CONTROL DEVICE FOR WALKING ASSIST DEVICE

(75) Inventors: Yasushi Ikeuchi, Wako (JP); Yoshihisa Matsuoka, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 847 days.

(21) Appl. No.: 12/482,072

(22) Filed: Jun. 10, 2009

(65) Prior Publication Data

US 2009/0312844 A1    Dec. 17, 2009

(30) Foreign Application Priority Data

Jun. 12, 2008 (JP) ................. 2008-153779

(51) Int. Cl.
*A61H 1/00* (2006.01)
*A61F 5/00* (2006.01)
*A47D 13/04* (2006.01)

(52) U.S. Cl. .............. 601/5; 601/34; 601/35; 602/23; 482/66

(58) Field of Classification Search ............ 602/16, 602/23–25, 5, 18, 19; 601/5, 33–35; 623/25, 623/30; 600/595; 607/48–49; 482/66, 128
See application file for complete search history.

(56) References Cited

FOREIGN PATENT DOCUMENTS

| JP | 04-141379 | 5/1992 |
|----|-----------|--------|
| JP | 2000-233001 | 8/2000 |
| JP | 2007-054616 | 3/2007 |
| JP | 2007-330299 | 12/2007 |

*Primary Examiner* — Kevin C Sirmons
*Assistant Examiner* — Ophelia A Hawthorne
(74) *Attorney, Agent, or Firm* — Rankin, Hill & Clark LLP

(57) ABSTRACT

A control system for a walking assist device includes a ground detecting means having a plurality of force sensors equipped to each foot attachment portion. Each ground sensor selectively outputs a ground state output and non-ground state output in accordance with whether the foot attachment portion is grounded at a position immediately below the ground sensor. The control system is equipped with means that continuously generate reference data for each of the ground detecting means, where the reference data increases and decreases in value in accordance with the change of a total number of the ground sensors generating ground state output in the ground detecting means. Also, a means that determines a mutual desired proportion of the supporting force to be applied to the both leg links from the floor side is provided.

4 Claims, 10 Drawing Sheets

CONTROL DEVICE FOR WALKING ASSIST DEVICE

BACKGROUND OF THE INVENTION

1. Field of the Invention

The present invention relates to a control device for a walking assist device for assisting a user (person) in walking.

2. Related Background Art

Conventionally, the applicant of the present application proposed this type of walking assist device, for example, in Japanese Patent Application Laid-Open No. 2007-54616 (hereinafter, referred to as Patent Document 1) and Japanese Patent Application Laid-Open No. 2007-330299 (hereinafter, referred to as Patent Document 2).

These Patent Documents 1 and 2 disclose a walking assist device including a seat member on which a user is seated in a straddling manner, a pair of left and right foot attachment portions fitted to the left and right feet of the user, respectively, and a pair of left and right leg links interconnecting the seat member and the left and right foot attachment portions, respectively.

In this walking assist device, each leg link includes a thigh frame extending from the seat member via a first joint (hip joint), a crus frame extending from the foot attachment portion via a second joint (ankle joint), and a third joint (knee joint) that interconnects the thigh frame and the crus frame so that the frames freely bend and stretch between the first joint and the second joint. Moreover, an electric motor for driving the third joint is mounted at an end of the thigh frame on the first joint side of each leg link. Further, in this walking assist device, in a state where the foot attachment portion is in contact with the ground, the electric motor applies a driving torque to the third joint of the leg link in the stretching direction of the leg link. This causes a lifting force to be applied to the user from the seat member and consequently the walking assist device bears a part of the weight of the user.

In this instance, the walking assist device controls the motion thereof as described below. Specifically, a desired total lifting force as a total supporting force (translational force), which is required to support a part of the weight of the user and the weight of the walking assist device on the floor, is distributed to the leg links at a ratio based on the treading forces of the legs of the user measured from the outputs of treading force measurement force sensors provided on the foot attachment portions. This determines the desired values of the supporting forces applied to the leg links from the floor side (the desired shares of the leg links of the desired total lifting force). In this case, the desired values of the supporting forces of the leg links are determined so that the mutual proportion between the desired values of the supporting forces of the left and right leg links is the same as the mutual proportion between the treading forces of the left and right legs of the user. Moreover, supporting forces actually acting on the leg links from the floor side are measured from the outputs of force sensors, each of which is interposed between the crus frame and the second joint of the corresponding leg link. Further, an output torque of the electric motor is feedback-controlled for each leg link so that a measured value of the supporting force coincides with the desired value. This allows the output torque of each electric motor to be controlled so that the desired lifting force acts on the user (a translational force supporting a part of the weight of the user) from the seat member.

In the walking assist device mentioned above, force at each leg link is generated so as to conform to the treading forces of each of the legs of the user, that is, the motion of the leg the user intends, so that the burden of the leg during the user walking or the like may be reduced effectively.

In the technique disclosed in the Patent Documents 1 and 2, it is necessary to have a plurality of treading force measuring force sensors for measuring the treading forces of each of the legs of the user, as well as an A/D converter for each of the treading force measuring force sensors in order to A/D convert the outputs thereof. Therefore, the production cost of the walking assist device is likely to increase.

Further, the output of each treading force measurement force sensor tends to change with a slight movement of the foot attachment portion upon landing. Therefore, there are cases when the mutual proportion of the treading forces of the left and right legs of the user instantaneously changes by the slight movement of the foot attachment portion upon landing. In such case, an instantaneous variation in the mutual proportion of the desired value of the supporting force of the left and right leg links is generated. Consequently, there is a fear that the behavior of the walking assist device becomes inappropriate for the behavior desired by the user.

SUMMARY OF THE INVENTION

The present invention has been made in view of the above background, and therefore it is an object of the present invention to provide a control device capable of performing an operation control of the walking assist device so that the mutual proportion of the supporting force acting on each of the both leg links from the floor side conforms to the mutual proportion of the actual treading force of each of the both legs of a user, using inexpensive sensors, and without providing a force sensor for treading force measurement to each of the foot attachment portions.

To achieve the above object, the present invention provides a control device for a walking assist device, in which the walking assist device comprises: a lifting force transmitting portion which is put in contact with the trunk of a user so as to allow an upward lifting force to be applied to the trunk of the user; a pair of left and right foot attachment portions fitted to the feet of the legs of the user; a pair of left and right leg links connecting the foot attachment portions to the lifting force transmitting portion, respectively, each of the leg links including a thigh frame extending from the lifting force transmitting portion via a first joint, a crus frame extending from each foot attachment portion via a second joint, and a third joint that interconnects the thigh frame and the crus frame so that the frames freely bend and stretch; and an actuator for driving the third joint of each leg link, the control device comprising: a desired proportion determining means which sequentially determines a mutual desired proportion of a supporting force to be applied to each of the leg links from the floor side, wherein a driving force of the actuator is controlled so as to apply a desired lifting force from the lifting force transmitting portion to the trunk of the user, and so as to make a mutual proportion of the supporting force actually applied to each leg link from the floor side to become the desired proportion determined by the desired proportion determining means; a ground detecting means comprising one or more ground sensors, the ground sensors being arranged on each foot attachment portion so as to be opposed to one or more locations in a bottom surface of the foot of each leg of the user, and which selectively generates a ground state output and a non-ground state output, which is a binary output in accordance with whether or not the foot attachment portion is grounded at a position immediately below each of the arranged locations; and a reference data generating means which sequentially generates a reference data for each ground detecting means on the basis of the output of the ground sensors of each ground detecting means, in which the value of the reference data increases and decreases in accordance with the change of a total number of the ground sensors generating the ground state output in each ground detecting means; wherein the desired proportion determining means is a means which determines the desired proportion in accordance with a mutual proportion of the values of the reference data for each ground detecting means generated by the reference data generating means (a first aspect of the invention).

When focusing attention to the mutual proportion of the total number of the ground sensors generating ground state output in the right ground detecting means (the ground detecting means provided to the foot attachment portion of the right leg of the user) and the total number of the ground sensors generating ground state output in the left ground detecting means (the ground detecting means provided to the foot attachment portion of the left leg of the user), during normal walking of the user, the mutual proportion approximately depend on the mutual proportion of the actual treading force of each of the legs of the user. For example, in the case where the treading force of the right leg of the user is larger compared to the treading force of the left leg, the total number in relation to the right ground detecting means generally becomes larger in number than the total number in relation to the left ground detecting means. Further, in the case where the treading force of the right leg and the treading force of the left leg is nearly equal, the total number in relation to the right ground detecting means becomes the same or approximately the same in number as the total number in relation to the left ground detecting means in many cases.

Therefore, the mutual proportion for the both ground detecting means of the reference data generated by the reference data generating means for each ground detecting means, that is, the value of the reference data which increase and decrease in value in accordance with the change of the total number of the ground sensors generating ground state output in each ground detecting means, shows change in accordance with the mutual proportion of the treading force for each of the both legs of the user. Further, the total number related to each of the right and left ground detecting means is a discrete integer value, so that the mutual proportion for the both ground detecting means of value of the reference data has high stability with respect to the instantaneous variation of the treading force of each of the both legs of the user.

Therefore, in the first aspect of the present invention, the desired proportion determining means determines the desired proportion in accordance with the mutual proportion of the value of the reference data for each ground detecting means. As such, it is possible to determine the desired proportion to a proportion conforming to the mutual proportion of the actual treading force of each of the both legs of the user.

Thus, according to the first aspect of the present invention, it is possible to perform an operation control of the walking assist device so that the mutual proportion of the supporting force acting on each of the both leg links from the floor side conforms to the mutual proportion of the actual treading force of each of the both leg links, using inexpensive sensors, and without providing a force sensor for treading force measurement to each of the foot attachment portions.

In the first aspect of the invention, the reference data generating means comprises a first data generating means which sequentially generates a first data for each ground detecting means, in which the value of the first data discretely increase and decrease in accordance with the change of the total number of the ground sensors generating ground state output in each ground detecting means, and a second data generating means which executes a second data generating process which is a process for generating a second data from the first data of each ground detecting means generated by the first data generating means, in which the value of the second data continuously changes so as to follow accompanied by a response delay a value of the first data or a value obtained by multiplying a predetermined gain to the value of the first data, and which obtains the second data generated by the second data generating process as the reference data (a second aspect of the invention).

According to the second aspect of the invention, the value of the first data increase and decrease discretely in accordance with the change of the total number. Thus, the value of the second data, generated from the first data by the second data generating process, continuously changes so as to follow accompanied by a response delay a value of the first data or a value obtained by multiplying a predetermined gain to the value of the first data. In the second aspect of the invention, this second data is used as the reference data to determine the desired proportion. Therefore, it is possible to smoothly and continuously change the desired proportion. Consequently, it is possible to perform the operation control of the walking assist device so that the mutual proportion of the supporting force acting on each of the both leg links from the floor side changes smoothly.

As the second data generating process, a low-pass characteristic filtering process provided to the first data may be given as an example.

The second aspect of the invention comprises a judgment means which sequentially judges whether or not the total number of the ground sensors generating the ground state output is zero, for each ground detecting means, wherein the second data generating process executed by the second data generating means is a process for increasing the response speed of the change of the value of the second data with respect to the change of the value of the first data in the case where the judgment result of the judgment means is positive, than in the case where the judgment result is negative (a third aspect of the invention).

Or, the invention comprises a judgment means which sequentially judges whether or not the total number of the ground sensors generating the ground state output is zero, for each ground detecting means, wherein the second data generating means generates as the second data the value of the first data or a value obtained by multiplying the predetermined gain to the value of the first data, by omitting the execution of the second data generating process, in the case where the judgment result of the judgment means is positive (a fourth aspect of the invention).

That is, the situation, where the total number of the ground sensors generating ground state output at each ground detecting means is zero, is the situation where the user intends to lift (leave the floor) the foot attachment portion equipped with the ground detecting means in the air. In such case, the supporting force to be applied from the floor side to the leg link on the foot attachment portion side leaving the floor should promptly be set to zero. However, in the case where the total number changes from a value larger than zero to zero, if the change of the value of the second data (the value of the reference data) is conducted gradually, the desired proportion is determined so as to gradually change the supporting force to be applied from the floor side to the leg link on the side of the foot attachment portion leaving the floor to zero.

Therefore, in the third aspect of the invention, the second data generating processing executed by the second data generating means is a process which increases the response speed of the change of the value of the second data with respect to the change of the value of the first data (change of the value of the first data in accordance with the change of the total number from a value larger than zero to zero) greatly in the case where the judgment result by the judgment means is positive than in the case where the judgment result is negative. Further, in the fourth aspect of the invention, the execution of the second data generating process is omitted, and the value of the first data or the value obtained by multiplying a predetermined gain to the value of the first data is generated as the second data, in the case where the judgment result of the judgment means is positive. Thus, in the fourth aspect of the invention, the value of the second data instantaneously coincide with the value of the first data or a value obtained by multiplying the predetermined gain to the value of the first data, in the case where the total number changes from a value larger than zero to zero.

By doing so, it is possible to promptly and smoothly carry out the leaving of the floor of the foot attachment portion, in the case where the total number in each ground detecting means changes from a value larger than zero to zero, that is, in the case where the foot attachment portion is going to be lifted in the air.

In the first to fourth aspects of the invention explained above, as a more specific embodiment thereof, for example, the control device is equipped with a supporting force measurement means which measures the supporting force actually acting on each leg link from the floor side, on the basis of an output of a supporting force measurement force sensor intervening between the crus frame and the second joint in each leg link; a supporting force desired value determining means which determines the desired value of the supporting force acting on each of the both leg links from the floor side so that the mutual proportion thereof becomes the desired proportion; and an actuator control means which feedback controls the driving force of the actuator so that the measured value of the supporting force of each leg link by the supporting force measurement means follow the desired value determined by the supporting force desired value determining means. By doing so, the actual supporting force to be applied to each of the both leg links from the floor side may be controlled to a desired magnitude, including the mutual proportion of the supporting force.

DETAILED DESCRIPTION OF THE PREFERRED EMBODIMENTS

Figure 1:
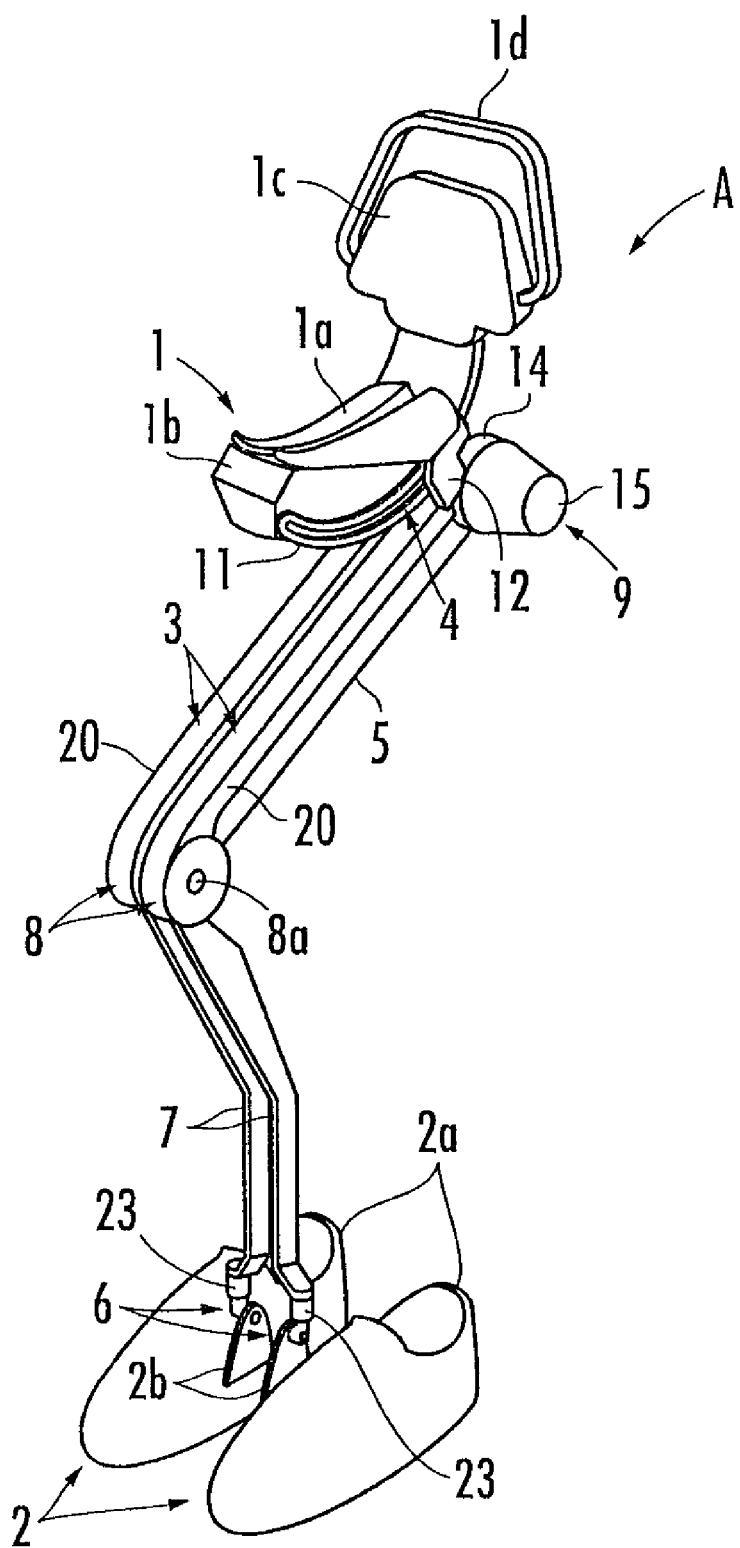
FIG. 1 is a perspective diagram illustrating a walking assist device according to one embodiment of the present invention.

An embodiment of the present invention will be described in detail hereinafter. First, a mechanical configuration of a walking assist device of this embodiment is described with reference to FIGS. 1 to 4.

As shown, the walking assist device A of this embodiment includes a seat member 1 as a lifting force transmitting portion, a pair of left and right foot attachment portions 2 and 2 fitted to the feet of the legs of a user P, and a pair of left and right leg links 3 and 3 connecting the foot attachment portions 2 and 2 to the seat member 1. The left and right foot attachment portions 2 and 2 have the same structure and are symmetrical with each other. The left and right leg links 3 and 3 have the same structure and are symmetrical with each other, too.

The leg link 3 includes a thigh frame 5 extending downward from the seat member 1 via a first joint 4, a crus frame 7 extending upward from the foot attachment portion 2 via a second joint 6, and a third joint 8 which is located between the first joint 4 and the second joint 6 to interconnect the thigh frame 5 and the crus frame 7 so that the frames freely bend and stretch.

Further, the walking assist device A has an actuator 9 which generates a driving force for driving the third joint 8 and a power transmission system 10 which transmits the driving force of the actuator 9 to the third joint 8 to apply a driving torque around a joint axis of the third joint 8 thereto for each leg link 3.

The seat member 1 includes a saddle-shaped seat 1a on which the user P is seated in a straddling manner (in a manner that the seat member 1 is positioned between the root ends of the legs of the user P), a supporting frame 1b attached to the undersurface of the seat 1a, and a hip cushion 1c mounted at the rear end (a raised portion which is raised upward at the back side of the seat 1a) of the supporting frame 1b. Additionally, the hip cushion 1c is provided with an arched gripper 1d that allows the user P to grip.

Although the lifting force transmitting portion is formed by the seat member 1 with the saddle-shaped seat 1a in this embodiment, it is possible to use, for example, a harness-shaped flexible member as shown in FIG. 16 of Patent Document 1, instead. Preferably, the lifting force transmitting portion has a part in contact with the user P between the root ends of the legs in order to apply an upward lifting force to the trunk of the user P.

The first joint 4 of each leg link 3 is a joint that has two degrees of freedom of rotation (two degrees of freedom) around two joint axes in the anteroposterior direction and in the horizontal direction. More specifically, the first joint 4 has an arc-shaped guide rail 11 connected to the seat member 1. The guide rail 11 is movably engaged with a slider 12 fixed to the top end of the thigh frame 5 of each leg link 3 via a plurality of rollers 13 rotatably attached to the slider 12. This enables the leg link 3 to make a swing motion in the anteroposterior direction (back and forth rocking motion) around a first joint axis of the first joint 4, where the first joint axis is a horizontal axis passing through the center of curvature 4a (See FIG. 2) of the guide rail 11 (more specifically, an axis in a direction perpendicular to the plane including the arc of the guide rail 11).

Moreover, the guide rail 11 is pivotally supported at the rear end (raised portion) of the supporting frame 1b of the seat member 1 via a spindle 4b whose central axis is oriented in the anteroposterior direction so as to be swingable around the central axis of the spindle 4b. This enables each leg link 3 to perform a swing motion in the horizontal direction around a second joint axis of the first joint 4, namely, an adduction and abduction motion, where the second joint axis is the central axis of the spindle 4b. In this embodiment, the second joint axis of the first joint 4 is a common joint axis between the left first joint 4 and the right first joint 4.

As described above, the first joint 4 is adapted to allow each leg link 3 to perform swing motions around two joint axes in the anteroposterior direction and in the horizontal direction.

The degrees of freedom of rotation of the first joint is not limited to "two." For example, the first joint may be adapted to have the degrees of freedom of rotation around three joint axes (three degrees of freedom). Alternatively, the first joint may be adapted to have, for example, only a degree of freedom of rotation around one joint axis (one degree of freedom) in the horizontal direction.

Figure 2:
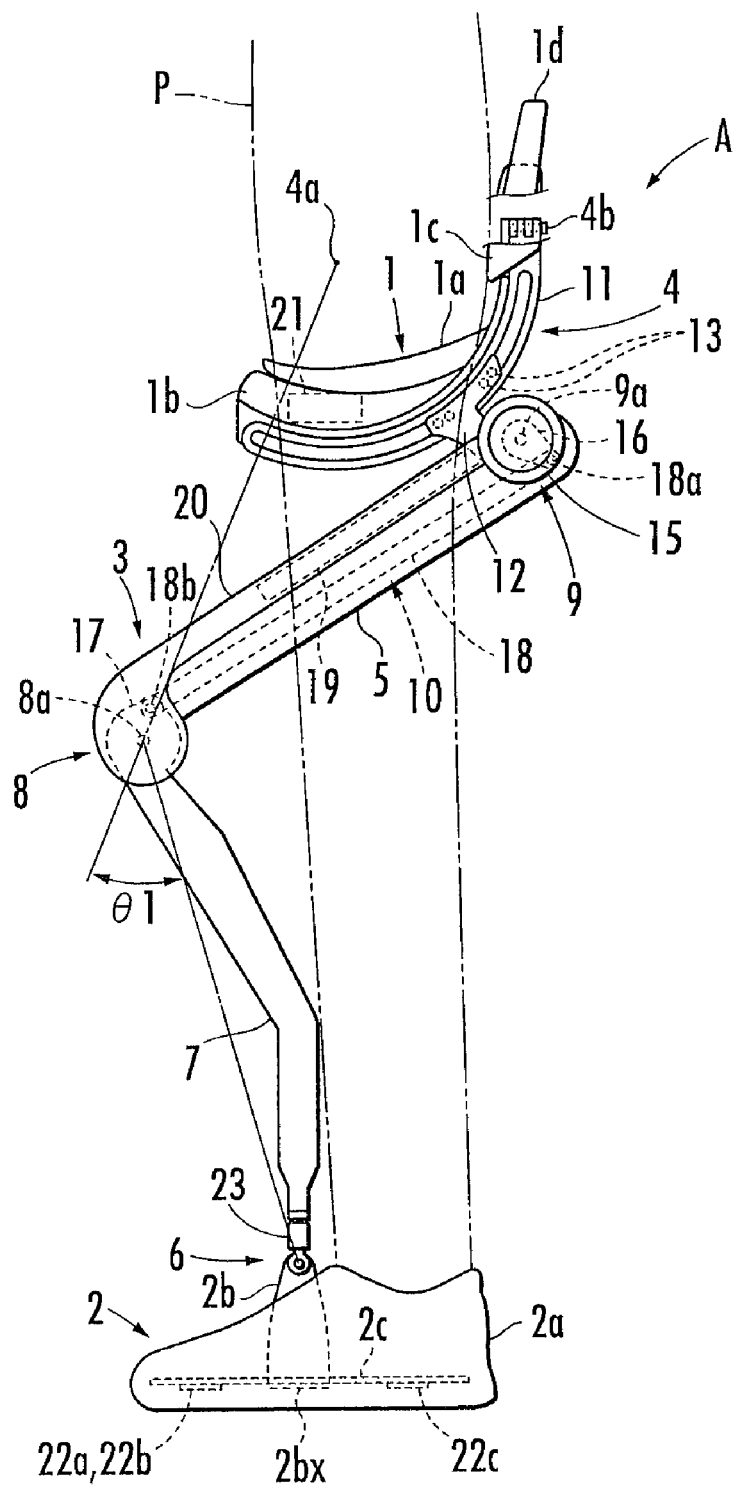
FIG. 2 is a side view of the walking assist device.
Figure 3:
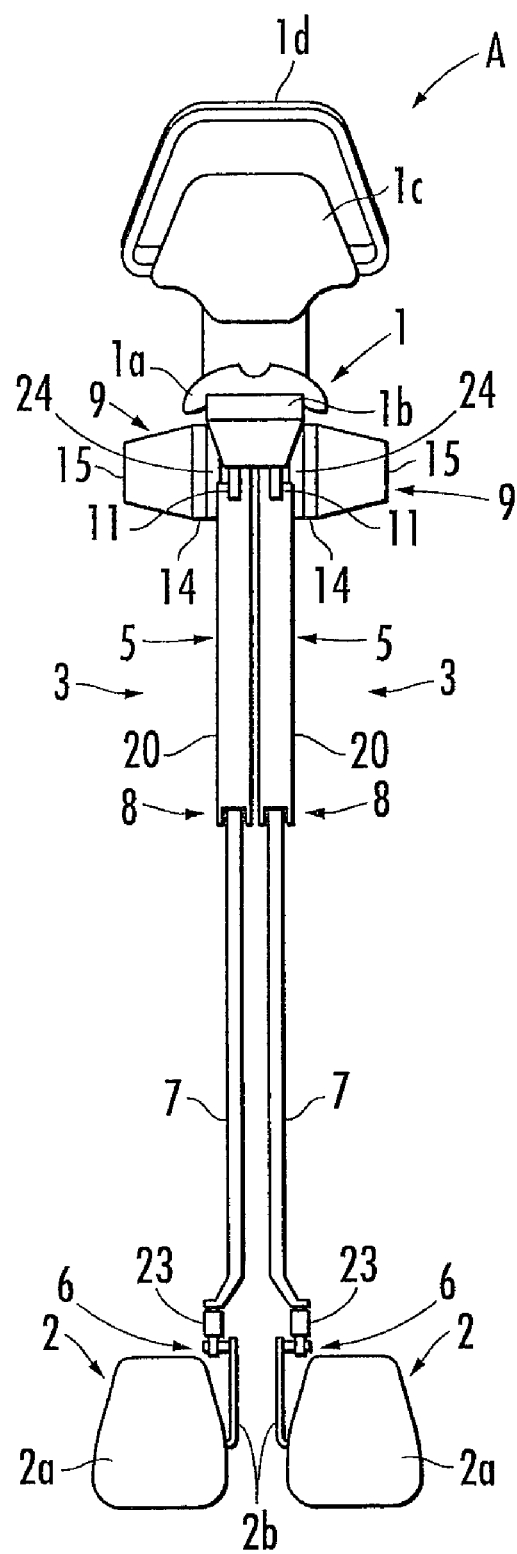
FIG. 3 is a front view of the walking assist device.

Each foot attachment portion 2 includes a shoe 2a fitted to the corresponding foot of the user P and a connecting member 2b projecting upwardly from the inside of the shoe 2a. The foot attachment portion 2 is in contact with the ground via the shoe 2a in a state where the leg of the user P is standing (supporting leg). The connecting member 2b is connected to the bottom end of the crus frame 7 of the leg link 3 via the second joint 6. In this instance, the connecting member 2b is integrally provided with a flat-plate portion 2bx placed on the backside of an insole 2c in the shoe 2a (between the bottom of the shoe 2a and the insole 2c) as shown in FIG. 2. The connecting member 2b including the flat-plate portion 2bx is formed of a relatively highly-rigid member. Thereby, it is possible to apply a part of the floor reaction force (at least a translational force large enough to support the weight of the walking assist device A plus a part of the weight of the user P), which acts on the foot attachment portion 2 from the floor side, to the leg link 3 via the connecting member 2b and the second joint 6 when the foot attachment portion 2 is put in contact with the ground.

The foot attachment portion 2 may include, for example, a slipper-shaped member, instead of the shoe 2a.

In this embodiment, the second joint 6 is formed of a free joint such a ball joint and has three degrees of freedom of rotation around three axes. The second joint, however, may be a joint having, for example, two degrees of freedom of rotation around two axes in the anteroposterior and horizontal directions or two degrees of freedom of rotation around two axes in the vertical and horizontal directions.

The third joint 8 has a degree of freedom of rotation around one axis in the horizontal direction. The third joint 8 has a spindle 8a which pivotally support the top end of the crus frame 7 at the bottom end of the thigh frame 5. The central axis of the spindle 8a is substantially parallel to the first joint axis (an axis perpendicular to the plane including the arc of the guide rail 11) of the first joint 4. The central axis of the spindle 8a serves as the joint axis of the third joint 8. The crus frame 7 is rotatable relative to the thigh frame 5 around the joint axis. This enables the bending and stretching motion of the leg link 3 at the third joint 8.

The actuator 9 provided in each leg link 3 is a rotary actuator formed by an electric motor 15 with a reduction gear 14. The rotary actuator 9 is mounted on the outer surface of the top end (near the first joint 4) of the thigh frame 5 so that the central axis of an output shaft 9a is parallel to the joint axis of the third joint 8 (the central axis of the spindle 8a). A housing (a portion fixed to a stator of the electric motor 15) of the rotary actuator 9 is provided in a fixed manner on the thigh frame 5.

In this embodiment, each power transmission system 10 includes a driving crank arm 16 fixed coaxially with the output shaft 9a of the rotary actuator 9, a driven crank arm 17 fixed to the crus frame 7 coaxially with the joint axis of the third joint 8, and a connecting rod 18 pivotally attached to the driving crank arm 16 and to the driven crank arm 17 at one end and the other end, respectively. The connecting rod 18 linearly extends between a pivotally attached portion 18a to the driving crank arm 16 and a pivotally attached portion 18b to the driven crank arm 17. In the power transmission system 10 having the above structure, the driving force (output torque) output from the output shaft 9a of the rotary actuator 9 by the operation of the electric motor 15 is converted to a translational force in the longitudinal direction of the connecting rod 18 from the output shaft 9a via the driving crank arm 16. Thereafter, the translational force (rod transmitting force) is transmitted through the connecting rod 18 in the longitudinal direction thereof. Further, the translational force is converted to a driving torque from the connecting rod 18 via the driven crank arm 17. Then, the driving torque is applied to the third joint 8 as a driving force for bending and stretching the leg link 3 around the joint axis of the third joint 8.

In this embodiment, the total sum of the lengths of the thigh frame 5 and the crus frame 7 of each leg link 3 is greater than the length of the leg of the user P in a state where the leg is linearly extending. Therefore, the leg links 3 are always flexed at the third joints 8. The flexion angle θ1 (See FIG. 2) ranges, for example, from approx. 40° to 70° during normal walking of the user P on flat ground. The flexion angle θ1 in this specification means an angle between a linear line connecting the third joint 8 and the center of curvature 4a of the guide rail 11 and a linear line connecting the third joint 8 and the second joint 6 (an angle on the acute side), with each leg link 3 viewed in the direction of the joint axis of the third joint 8, as shown in FIG. 2. In this embodiment, a relative positional relation is set among the pivotally attached portions 18a and 18b of the connecting rod 18, the joint axis of the third joint 8, and the output shaft 9a of the rotary actuator 9 in such a way that the driving torque applied to the third joint 8 is greater than the output torque of the rotary actuator 9 in a state where the flexion angle θ1 of each leg link 3 is within a certain angle range (for example, a range of approx. 20° to 70°) including the range of angles observed during normal walking of the user P on flat ground. In this condition, when each leg link 3 is viewed in the direction of the joint axis of the third joint 8 in this embodiment, the linear line between the output shaft 9a of the rotary actuator 9 and the third joint 8 obliquely intersects with the linear line between the pivotally attached portions 18a and 18b of the connecting rod 18 as shown in FIG. 4.

Further, in this embodiment, the position of the pivotally attached portion 18b of the connecting rod 18 is set in such a way that the driving torque applied to the third joint 8 functions as a torque for biasing the leg link 3 in the stretching direction in cases where a tractive force in the longitudinal direction of the connecting rod 18 is applied to the connecting rod 18 by the rotary actuator 9 in a state where the flexion angle θ1 of each leg link 3 is within a certain angle range (for example, a range of approx. 20° to 70°) including the range of angles observed during normal walking of the user P on flat ground. In this case, when the leg link 3 is viewed in the direction of the joint axis of the third joint 8 in this embodiment, the pivotally attached portion 18b of the connecting rod 18 is provided closer to the guide rail 11 than the linear line between the output shaft 9a of the rotary actuator 9 and the third joint 8.

Figure 4:
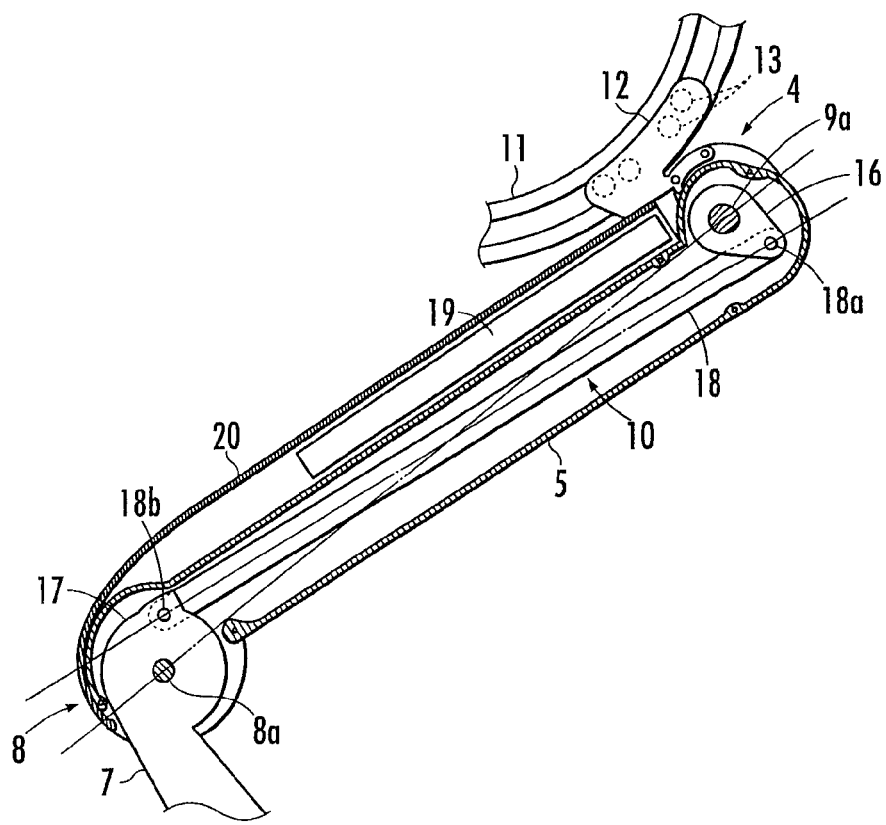
FIG. 4 is a cross-sectional side view of a thigh frame of the walking assist device.

Moreover, as shown in FIG. 4, the thigh frame 5 is provided with a battery 19 placed between the connecting rod 18 and the guide rail 11 and a cover 20 for covering the battery 19. The battery 19 is a power source for electric devices such as the electric motor 15.

In the present embodiment, each of the power transmission systems 10 is configured as explained above. However, for example, it may be configured by mounting a pulley which rotates integrally with the crus frame 7 around the joint axis of the third joint 8 to the third joint 8, and transmits the driving force from the rotary actuator 9 to the pulley via a wire or a belt. Further, it may be configured by providing the rotary actuator 9 coaxially with the joint axis of the third joint 8, so that the output torque of the rotary actuator 9 is provided directly to the third joint 8.

The above is the main mechanical configuration of the walking assist device A according to this embodiment. In the walking assist device A having the above structure, the seat member 1 is biased upwardly by applying the driving force (driving torque) in the stretching direction to the third joint 8 of the leg link 3 from the rotary actuator 9 via the power transmission system 10 in a state where the foot attachment portion 2 is in contact with the ground. This causes the upward lifting force to act on the user P from the seat member 1. In the walking assist device A of this embodiment, the lifting force supports a part of the weight of the user P (a part of the gravity acting on the user P) to reduce the load on the leg in walking of the user P.

In this condition, the walking assist device A bears the share of the supporting force for supporting the weight of the walking assist device A and a part of the weight of the user P on the floor of the supporting force for supporting the entire weight of the walking assist device A and the user P on the floor (the total translational force acting on the supporting surface of the walking assist device A from the floor, which is hereinafter referred to as "total supporting force"), and the user P bears the share of the remaining supporting force. Hereinafter, in the above total supporting force, the supporting force as the share of the walking assist device A is referred to as "assist device share supporting force" and the supporting force as the share of the user P is referred to as "user share supporting force." The assist device share supporting force acts on both of the leg links 3 and 3 in a distributed manner in a state where the legs of the user P are standing. In a state where only one leg of the user P is standing, the assist device share supporting force acts only on the standing leg link 3 of the leg links 3 and 3. The same applies to the user share supporting force.

The following describes a structure for controlling the motion of the walking assist device A according to this embodiment. In the walking assist device A of this embodiment, the supporting frame 1b of the seat member 1 houses a controller 21 (control device) for controlling the operation of the electric motor 15 of each rotary actuator 9 as shown in FIG. 2.

Figure 5:
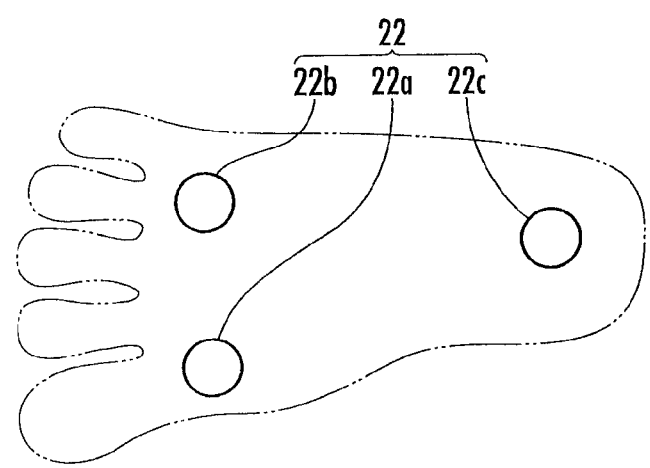
FIG. 5 is a planar view indicating the arrangement of ground sensors provided to the walking assist device.

Moreover, the walking assist device A has sensors as described below and outputs of the sensors are input to the controller 21. As shown in FIG. 2 and FIG. 5, in the shoe 2a of each foot attachment portion 2, there is provided a ground detecting means 22 consisting of a plurality of (three in the present embodiment) ground sensors 22a, 22b, and 22c. FIG. 5 is a planar view indicating the location of the ground sensors 22a, 22b, and 22c.

Each of the ground sensors 22a, 22b, and 22c is, for example, a sensor having a contact switch which closes (turns on) by receiving pressing force, and outputs binary value corresponding to the on/off thereof. In this case, these ground sensors 22a, 22b, and 22c are mounted on the undersurface of the insole 2c in the shoe 2a so as to be opposed to the base of the foot of the leg of the user P at a plurality of places (three places in the present embodiment). The mounting places (the locations of the ground sensors 22a, 22b, and 22c) in the present embodiment are, as shown in FIG. 5, three places, namely just under the first metatarsophalangeal joint (first MP joint), just under the fourth metatarsophalangeal joint (fourth MP joint), and just under the heel of the foot of the user P.

The ground sensors 22a, 22b, and 22c provided to each of the foot attachment portion 2 as explained above is turned on when receiving pressing force by the grounding of the bottom surface of the foot attachment portion 2 at place just under each of the ground sensor, stated otherwise, when receiving treading force of each leg of the user P (a translational force in the vertical direction so as to press the foot of each leg towards the floor surface side). And, in the state where the ground sensors 22a, 22b, and 22c do not receive pressing force (do not receive treading force), such as in the case where the foot attachment portion 2 is moving in air, the ground sensors 22a, 22b, and 22c are turned off. Therefore, each of the ground sensors 22a, 22b, and 22c alternatively generates a binary output of a ground state output and a non-ground state output which indicates whether or not each of the place just under each of the ground sensors 22a, 22b, and 22c within the bottom surface of the foot attachment portion 2 is grounded or not.

In the present embodiment, each of the ground detecting means 22 is comprised of a plurality of the ground sensors 22a, 22b, and 22c, in many situations in the following explanation, the ground detecting means 22 will be referred to as a ground sensor group 22. Further, a set of the output from each of the ground sensors 22a, 22b, and 22c will sometimes be referred to as an output of the ground sensor group 22.

Supplementary, in states where the bottom surface of the foot attachment portion 2 touches the floor slightly, for example in the state immediately after landing of the foot attachment portion 2, or immediately before lifting thereof, each of the ground sensors 22a, 22b, and 22c does not receive pressing force almost at all, so that the same is not turned on. The "grounded state" in the present specification means the state where the foot attachment portion 2 contacts the floor surface in the situation in which any one of the ground sensors 22a, 22b, and 22c receives pressing force to a certain extent.

Further, in between the crus frame 7 and the second joint 6 of each leg link 3, there is provided a supporting force measurement force sensor 23 which measures the supporting force acting on each of the leg link 3 from the floor side, that is, the share of each leg link 3 of the assist device share supporting force. The supporting force measurement force sensor 23 is a three-axis force sensor which detects translational force in three axes. However, in the present embodiment, of the translational force of in three axes detected by the sensor, only the detected values of translational force in two axes are used, as will be described later. Therefore, the supporting force measurement force sensor 23 may be configured from a two-axis force sensor which detects translational force in two axes.

Moreover, in order to measure the flexion angle of each leg link 3 as an angle representing a displacement angle (a relative rotation angle from a reference position of the crus frame 7 with respect to the thigh frame 5) of the third joint 8 of each leg link 3, an angle sensor 24 (shown in FIG. 3) such as a rotary encoder which generates an output according to the rotation angle (the rotation angle from the reference position) of the output shaft 9a of each rotary actuator 9 is mounted on the thigh frame 5 integrally with the rotary actuator 9. In this embodiment, the flexion angle of the third joint 8 of each leg link 3 is uniquely determined according to the rotation angle of the output shaft 9a of each rotary actuator 9. Therefore, the angle sensor 24 generates an output according to the flexion angle of each leg link 3. The third joint 8 of each leg link 3 corresponds to the knee joint and therefore the flexion angle of each leg link 3 at the third joint 8 is referred to as a knee angle in the following description.

Incidentally, it is possible to mount an angle sensor such as a rotary encoder at the third joint 8 of each leg link 3 so as to directly measure the knee angle of the leg link 3 by means of the angle sensor, instead.

Figure 6:
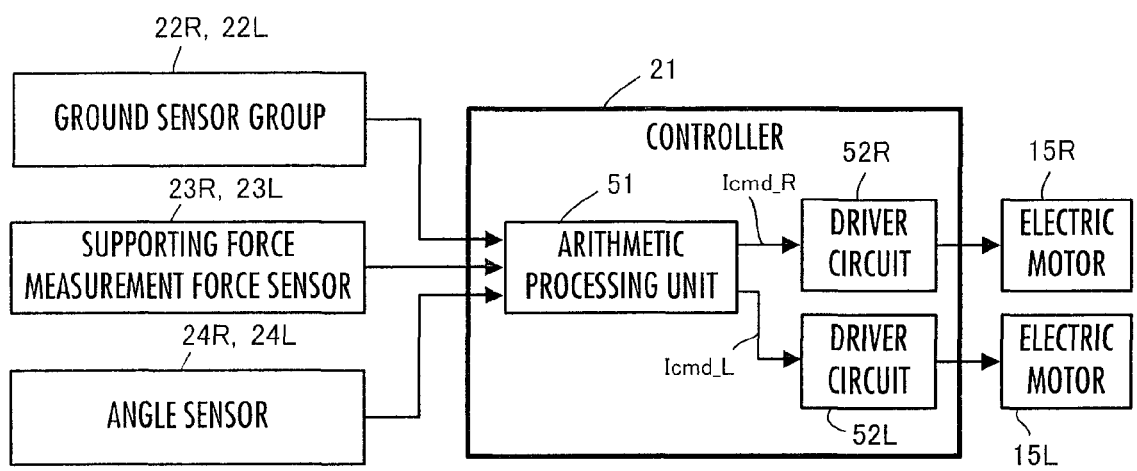
FIG. 6 is a block diagram illustrating the outline of a hardware configuration of a controller provided in the walking assist device.
Figure 7:
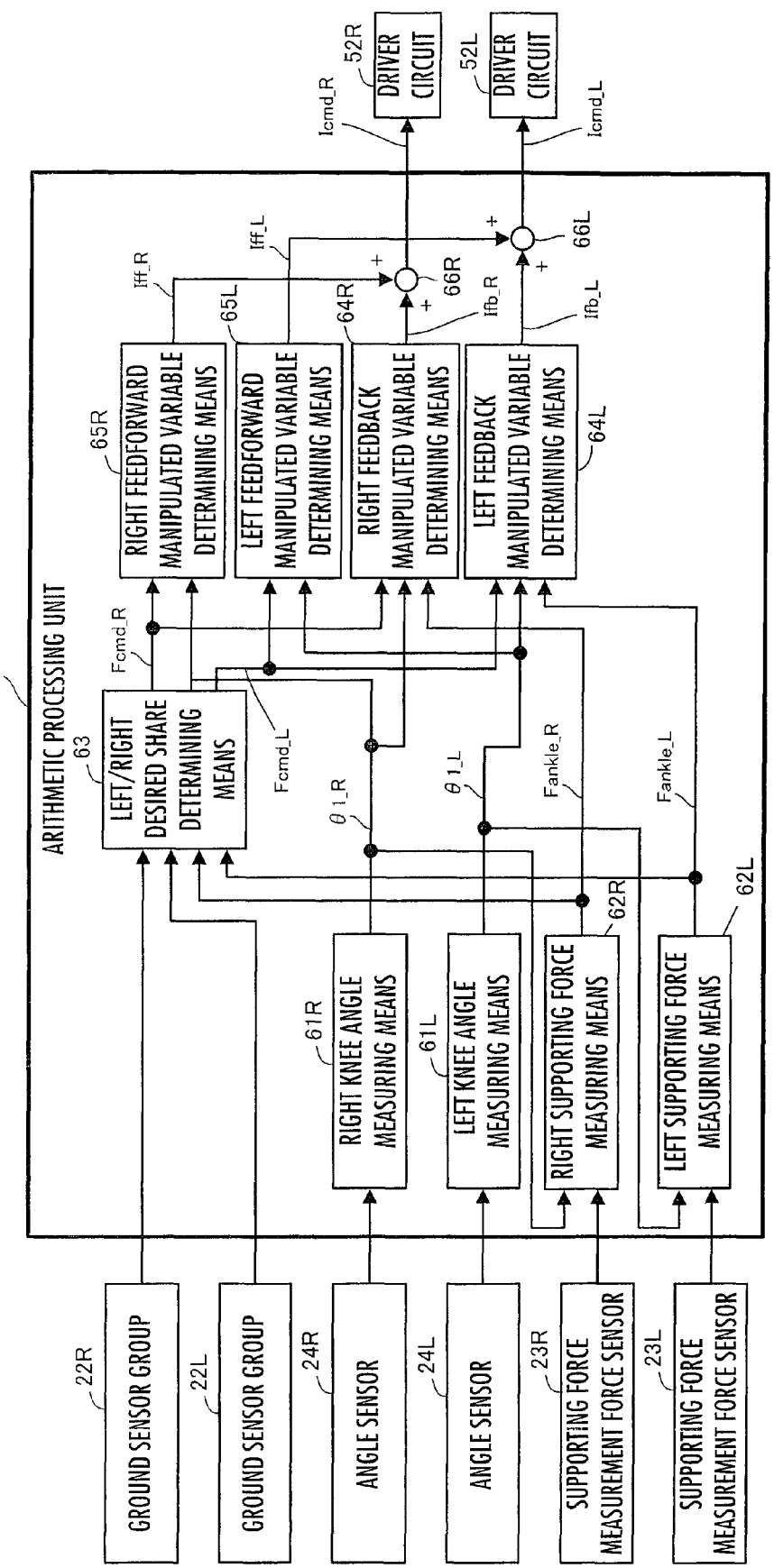
FIG. 7 is a block diagram illustrating a processing function of an arithmetic processing unit of the controller.

The following describes the functions of the controller 21 in more detail with reference to FIGS. 6 and 7. In the following description, a character "R" or "L" may be added to the end of a reference character in order to distinguish between left and right. For example, a term "leg link 3R" is used to indicate the leg link 3 on the right side of the user P in the forward direction and "leg link 3L" is used to indicate the leg link 3 on the left side of the user P. The character "R" and "L" at each end of reference characters are used to indicate elements related to the right leg link 3R or to the left leg link 3L.

As shown in FIG. 6, the controller 21 includes an arithmetic processing unit 51 and driver circuits 52R and 52L which respectively apply electric current to the electric motors 15R and 15L of the rotary actuators 9R and 9L. The arithmetic processing unit 51 is composed of a microcomputer including a CPU, a RAM, and a ROM. The arithmetic processing unit 51 receives outputs of ground sensor groups 22R and 22L, outputs of supporting force measurement force sensors 23R and 23L, and outputs of angle sensors 24R and 24L via an interface circuit (not shown) composed of an A/D converter or the like. Thereafter, the arithmetic processing unit 51 determines indicator current values Icmd_R and Icmd_L which are indicator values (desired values) of the applied current of the electric motors 15R and 15L by performing desired arithmetic processing by using detection data having been input and previously-stored reference data and program. The arithmetic processing unit 51 then controls the driver circuits 52R and 52L to apply the current of the indicator current values Icmd_R and Icmd_L to the electric motors 15R and 15L, respectively. This controls the output torques of the electric motors 15R and 15L and consequently the output torques of the rotary actuators 9R and 9L.

The arithmetic processing unit 51 has functional means as shown in the block diagram of FIG. 7 in order to determine the above indicator current values Icmd_R and Icmd_L. The functional means are functions implemented by the program mounted on the arithmetic processing unit 51.

As shown in FIG. 7, the arithmetic processing unit 51 includes: a right knee angle measuring means 61R which measures a knee angle of the leg link 3R on the basis of an output of the right angle sensor 24R; a left knee angle measuring means 61L which measures a knee angle of the leg link 3L on the basis of an output of the left angle sensor 24L; a right supporting force measuring means 62R for measuring the supporting force acting on the leg link 3R from the floor side on the basis of an output of the right supporting force measurement force sensor 23R and a value (a detected value) $\theta1\_R$ of the knee angle of the leg link 3R measured by the right knee angle measuring means 61R; and a left supporting force measuring means 62L for measuring the supporting force acting on the leg link 3L from the floor side on the basis of an output of the left supporting force measurement force sensor 23L and a value (a detected value) $\theta1\_L$ of the knee angle of the leg link 3L measured by the left knee angle measuring means 61L.

Moreover, the arithmetic processing unit 51 includes a left/right desired share determining means 63 which determines desired values Fcmd_R and Fcmd_L of the shares of the leg links 3R and 3L of the assist device share supporting force. The left/right desired share determining means 63 receives inputs of the outputs from the ground sensor groups 22R and 22L in order to determine the desired values Fcmd_R and Fcmd_L.

Incidentally, the total sum of the supporting forces which respectively act on the leg links 3R and 3L via the second joints 6R and 6L from the floor side (hereinafter, the total sum is referred to as "total lifting force") is more accurately a supporting force obtained by subtracting the supporting forces for supporting the foot attachment portions 2R and 2L on the floor from the assist device share supporting force. In other words, the total lifting force means an upward translational force for supporting the weight of the walking assist device A not including the foot attachment portions 2R and 2L and a part of the weight of the user P. Note that, however, the total weight of the foot attachment portions 2R and 2L is sufficiently small in comparison with the total weight of the walking assist device A and therefore the total lifting force substantially coincides with the assist device share supporting force. In the following description, the shares of the leg links 3R and 3L of the assist device share supporting force are totally referred to as "total lifting force share." Measured values Fankle_R and Fankle_L of the supporting force by the right and the left supporting force measurement means 62R and 62L are the measured values of the total lifting force share. Further, in the following explanation, the desired values Fcmd_R and Fcmd_L of the total lifting force share of each leg link 3R and 3L will be referred to as a control desired value Fcmd_R and Fcmd_L.

The arithmetic processing unit 51 is further equipped with: a right feedback manipulated variable determining means 64R which receives inputs of the measured value Fankle_R of the total lifting force share of the leg link 3R by the right supporting force measuring means 62R, the control desired value Fcmd_R of the right leg link 3R determined by the left/right desired share determining means 63, and the measured value $\theta1\_R$ of the knee angle of the leg link 3R by the right knee angle measuring means 61R; a left feedback manipulated variable determining means 64L which receives inputs of the measured value Fankle_L of the total lifting force share of the left leg link 3L by the left supporting force measuring means 62L, the control desired value Fcmd_L of the left leg link 3L determined by the left/right desired share determining means 63, and the measured value $\theta1\_L$ of the knee angle of the leg link 3L by the left knee angle measuring means 61L; a right feedforward manipulated variable determining means 65R which receives inputs of the control desired value Fcmd_R of the right leg link 3R determined by the left/right desired share determining means 63, and the measured value $\theta1\_R$ of the knee angle of the leg link 3R by the right knee angle measuring means 61R; and a left feedforward manipulated variable determining means 65L which receives inputs of the control desired value Fcmd_L of the left leg link 3L determined by the left/right desired share determining means 63, and the measured value $\theta1\_L$ of the knee angle of the leg link 3L by the left knee angle measuring means 61L. Each of the feedback manipulated variable determining means 64 is a means for calculating a feedback manipulated variable Ifb (feedback component of the indicator current value of each electric motor 15) so as to converge the deviation between the measured value Fankle of the input total lifting force share and the control desired value Fcmd to zero. Further, each of the feedforward manipulated variable determining means 65 is a means for calculating a feedforward manipulated variable Iff (feedforward component of the indicator current value of each electric motor 15) for applying the supporting force of the control desired value Fcmd to each of the leg link 3 from the floor side, from the input control desired value Fcmd and the measured value θ1 of the knee angle using a feedforward control law (model).

Further, the arithmetic processing unit 51 is equipped with: an addition operation means 66R which obtains the indicator current value Icmd_R for the right electric motor 15R by adding the feedback manipulated variable Ifb_R calculated by the right feedback manipulated variable determining means 64R and the feedforward manipulated variable Iff_R calculated by the right feedforward manipulated variable determining means 65R (correct the feedforward manipulated variable by the feedback manipulated variable); and an addition operation means 66L which obtains the indicator current value Icmd_L for the left electric motor 15L by adding the feedback manipulated variable Ifb_L calculated by the left feedback manipulated variable determining means 64L and the feedforward manipulated variable Iff_L calculated by the left feedforward manipulated variable determining means 65L (correct the feedforward manipulated variable by the feedback manipulated variable).

The following describes the details of the processing of the arithmetic processing unit 51. The controller 21 is turned on in a state where the user P wears the foot attachment portions 2 on the feet with the seat member 1 placed under the crotch of the user P. In this condition, the arithmetic processing unit 51 performs processing described below at predetermined control processing cycles.

In each control processing cycle, the arithmetic processing unit 51 first performs processing of the knee angle measuring means 61R and 61L, the processing of the supporting force measuring means 62R and 62L, and the processing of the left/right desired share determining means 63.

The processing of the knee angle measuring means 61R and 61L is performed as described below. The algorithm of the processing is the same in either of the knee angle measuring means 61R and 61L. Therefore, the processing of the right knee angle measuring means 61R is typically described below. The right knee angle measuring means 61R obtains a provisional measurement value of the knee angle of the leg link 3R from a rotation angle of an output shaft 9aR of the rotary actuator 9R indicated by an output of the angle sensor 24R on the basis of a preset arithmetic expression or data table (an arithmetic expression or a data table representing a relationship between the rotation angle and the knee angle of the leg link 3R). The right knee angle measuring means 61R then obtains a measured value θ1_R of the knee angle of the leg link 3R by performing low-pass characteristic filtering for the provisional measurement value to remove noise components. The same applies to the processing of the left knee angle measuring means 61L.

Specifically, the knee angle measured by the knee angle measuring means 61 is the angle θ1 shown in FIG. 2, though the knee angle may be a supplementary angle of the angle θ1 (=180°−θ1), instead. Alternatively, for example, when viewed in the joint axis direction of the third joint 8 of each leg link 3, the knee angle may be defined as an angle between the longitudinal direction of the thigh frame 5 of each leg link 3 and a linear line connecting the third joint 8 to the second joint 6 of the leg link 3. In the following description, the knee angle measured by the knee angle measuring means 61 is assumed to be the angle θ1 shown in FIG. 2.

Figure 8:
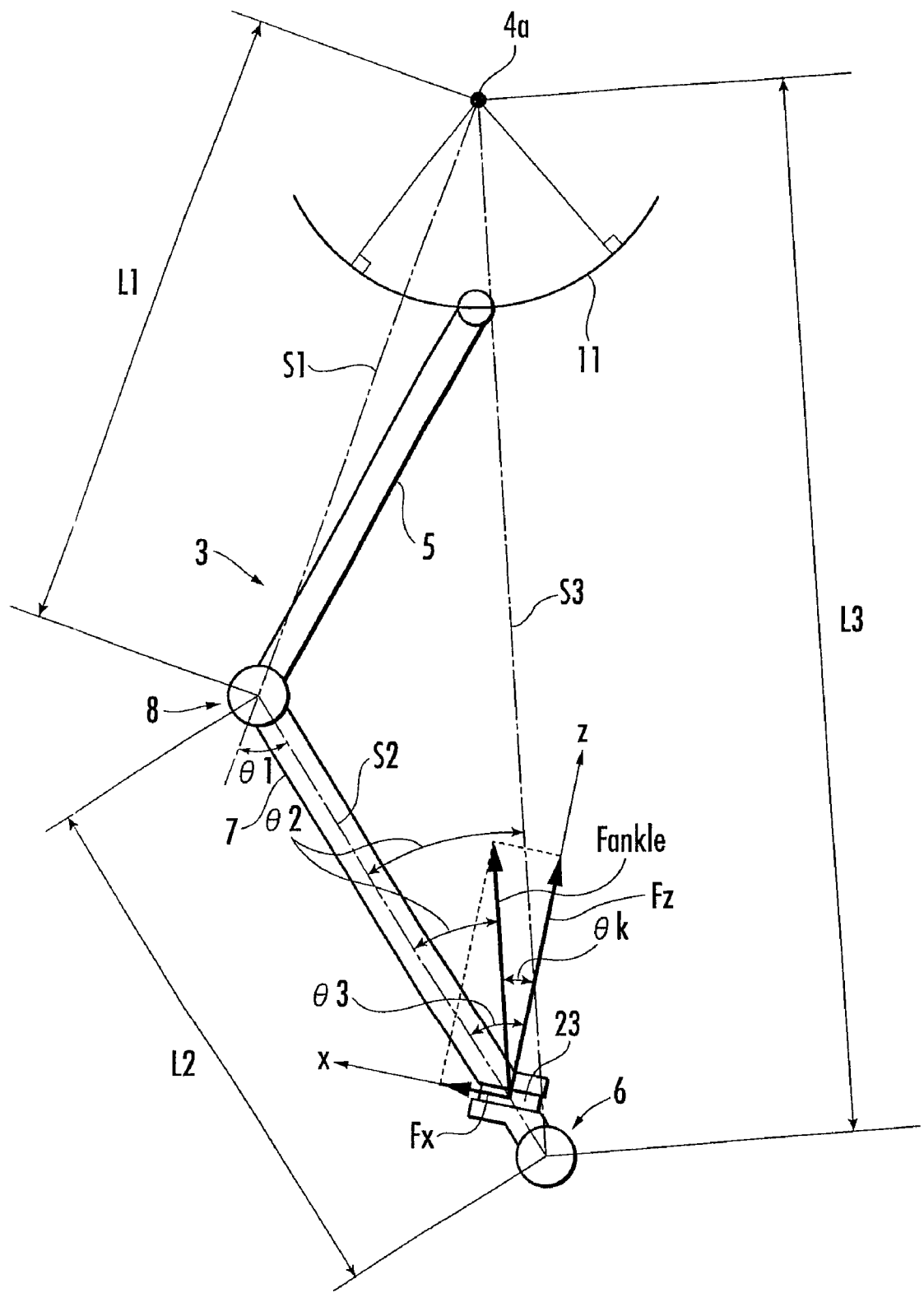
FIG. 8 is a view for explaining the processing of a supporting force measurement processing means shown in FIG. 7.

The processing of the supporting force measuring means 62R and 62L is performed as described below, after the respective knee angle measuring means 61R and 61L is performed. The algorithm of the processing is the same in either of the supporting force measuring means 62R and 62L. Therefore, the processing of the right supporting force measuring means 62R is typically described below with reference to FIG. 8. FIG. 8 schematically shows the substantial structure of the leg link 3. Although the character "R" at each end of the reference characters are omitted in the following description of the processing by the right supporting force measuring means 62R, unless otherwise specified herein, the reference characters are assumed to relate to the right leg link 3R (the character "R" is omitted).

With reference to FIG. 8, Fankle denotes the supporting force acting on the leg link 3 from the floor side via the second joint 6 (the supporting force acting on the supporting force measurement force sensor 23), that is, the total lifting force share of the leg link 3, and S3 denotes a line segment between the center of curvature 4a of the guide rail 11 and the second joint 6. At this time, the total lifting force share Fankle becomes the translational force in a direction approximately parallel to the line segment S3.

On the other hand, as shown, the supporting force measurement force sensor 23 detects a force Fz in the z axis direction which is perpendicular to the surface (the upper surface or the lower surface) of the force sensor 23, and a force Fx in the x axis direction which is perpendicular to the z axis and parallel to the surface of the force sensor 23. The x axis and the z axis are coordinate axes fixed to the force sensor 23, and are axes parallel to the surface including the arc of the guide rail 11. Here, the detected Fz and Fx are component in the z axis direction and component in the x axis direction, respectively, of Fankle. Therefore, as shown, where the angle between Fankle and the z axis is θk, Fankle may be calculated from the detected value of Fz and Fx, and from θk by the following equation (1):

$$Fankle = Fx \cdot \sin\theta k + Fz \cdot \cos\theta k \quad (1)$$

Further, the angle θk may be obtained as follows. That is, S1 denotes a line segment between the center of curvature 4a of the guide rail 11R and the third joint 8, S2 denotes the line segment between the third joint 8 and the second joint 6, and θ2 denotes an angle between the line segment S2 and the line segment S3 (an angle on the acute side). At this time, the lengths L1 and L2 of the line segments S1 and S2, respectively, in a triangle having three sides of the line segments S1, S2 and S3, take constant values (known values set previously). Further, the angle θ1 between the line segments S1 and S2 (an angle on the acute side) is the knee angle measured by the knee angle measuring means 61. Therefore, an angle θ2 is obtained from a geometric calculation of length L1 and L2 of the line segments S1 and S2, respectively (the values previously stored in a memory) and from the measured value θ1 of the knee angle.

More specifically, in a triangle having three sides of the line segments S1, S2, and S3, the following relational expressions (2) and (3) are satisfied, in which L3 is the length of the line segment S3:

$$L3^2 = L1^2 + L2^2 - 2 \cdot L1 \cdot L2 \cdot \cos(180° - \theta1) \quad (2)$$

$$L1^2 = L2^2 + L3^2 - 2 \cdot L2 \cdot L3 \cdot \cos\theta2 \quad (3)$$

Equation (2) enables the calculation of the length L3 from the L1 and L2 values and the measured value θ1 of the knee angle. Further, equation (3) enables the calculation of the angle θ2 from the calculated L3 value and the L1 and L2 values.

Further, when θ3 denotes the angle between z axis and the line segment S2, the angle θ3 takes a constant value (fixed value) predetermined according to the fixation angle of the supporting force measurement force sensor 23 with respect to the crus frame 7. By subtracting the angle θ2 calculated as explained above from the angle θ3 of the constant value (the value is previously stored in a memory not shown), the value of the angle θk necessary for the calculation of expression (1) may be obtained. The angle θk eventually becomes a function value of the knee angle, therefore the relationship between the knee angle and the angle θk may be mapped in advance. In this instance, the angle θk may be obtained on the basis of the map from the measured value θ1 of the knee angle.

In the processing of the right supporting force measuring means 62 of the present embodiment, the measured value Fankle of the total lifting force share of the right leg link 3 is calculated from the angle θk calculated as explained above and the detected values Fx and Fz of the supporting force measurement force sensor 23, by the equation (1).

The above is the details of the processing of the right supporting force measuring means 62R. The same applies to the processing of the left supporting force measuring means 62L.

In the present embodiment, the measured value Fankle of the total lifting force share of each leg link 3 is obtained by the above equation (1). However, the calculated value of a square root of a sum of a square value of the detected value Fx of the force in the x axis direction and a square value of the detected value Fz of the force in the z axis direction, where the values Fx and Fz are detected by the supporting force measurement force sensor 23, may be obtained as the measured value Fankle, for example. In this case, the measured value θ1 of the knee angle is not necessary for obtaining the measured value Fankle. Further, for example, a value obtained by dividing Fx by sin θk, or a value obtained by dividing Fz by cos θk may be obtained as the measured value Fankle of the total lifting force share. In this case, the supporting force measurement force sensor 23 may be a one-axis sensor.

Figure 9:
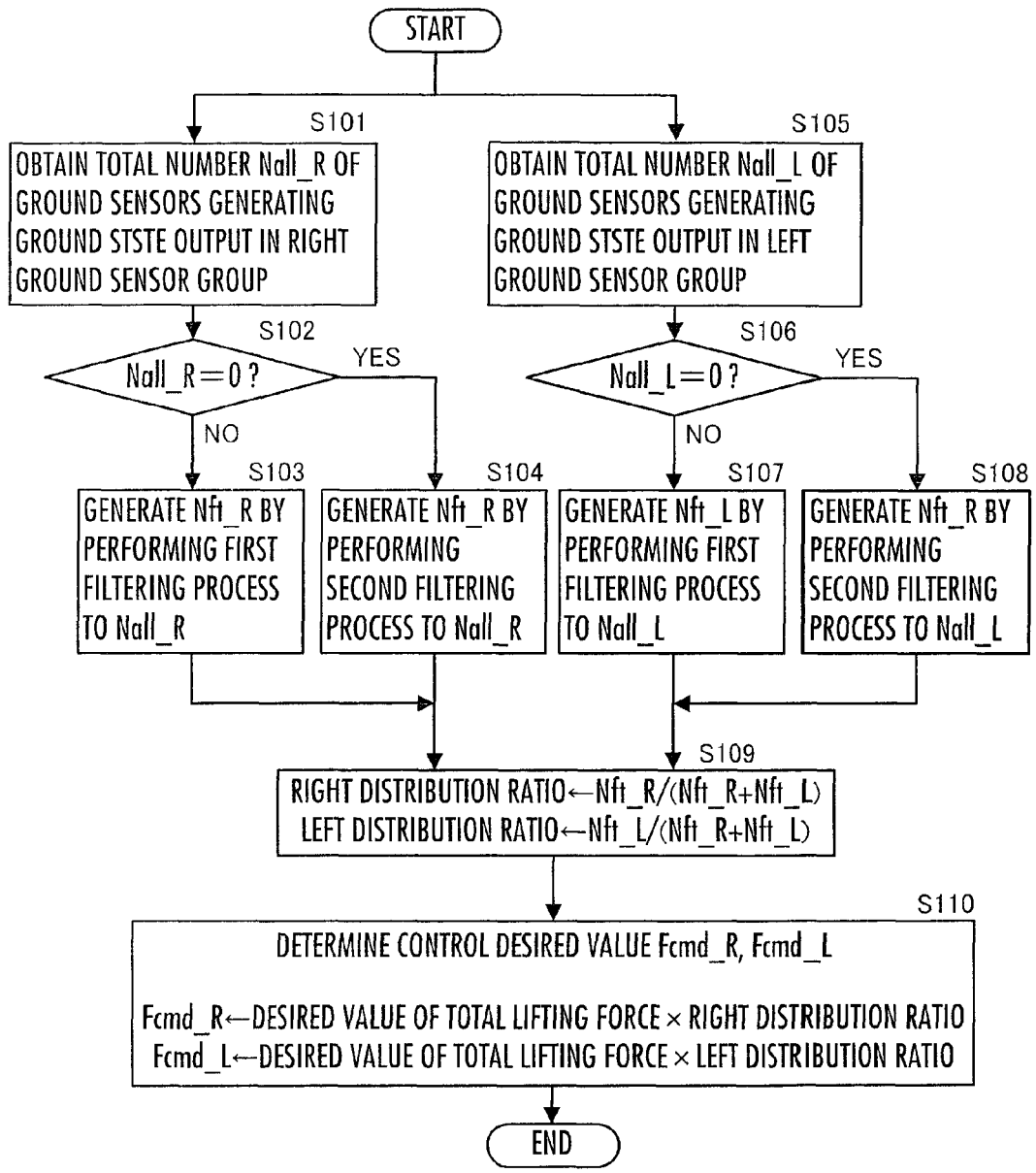
FIG. 9 is a flowchart illustrating a procedure of a left/right desired share determining means shown in FIG. 7.

Further, the processing by the left/right desired share determining means 63 is executed as follows. The processing will be explained below with reference to FIG. 9.

First, the processing of S101 through S104 and the processing of S105 through S108 are executed in series or in parallel. These processings are the processing for generating reference data Nft_R and Nft_L for each of the ground sensor groups 22R and 22L, in order to determine the mutual proportion of the control desired values Fcmd_R and Fcmd_L. The processing of S101 through S104 is a processing for generating the reference data Nft_R corresponding to the right ground sensor group 22R, and the processing of S105 through S108 is a processing for generating the reference data Nft_L corresponding to the left ground sensor group 22L. In this embodiment, the processing of S101 through S104 and the processing of S105 through S108 corresponds to the reference data generating means of the present invention.

In the processing of S101 through S104, first, at S101, a total number Nall_R of the ground sensors generating the ground state output out of the right ground sensor group 22R is obtained. The total number Nall_R is an integer of any one of zero through three in the present embodiment. Therefore, Nall_R is a discrete value.

Next, in S102, it is determined whether or not the total number Nall_R obtained as explained above is zero. The processing of S102 (and S106) which judges whether or not the total number Nall R (and Nall L) of the ground sensors 22R (and 22L) generating the ground state output is zero or not corresponds to the judgment means of the present invention. If the determination result is negative, then a first filtering process is performed to Nall_R in S103. Further, if the determination result in S102 is positive, then a second filtering process is performed to Nall_R in S104. By the processing in either S103 or S104, the reference data Nft_R for the right ground sensor group 22R is generated.

The first filtering process at S103 is a low-pass characteristic filtering process. In this instance, the cut-off frequency thereof is, for example, about 2 Hz. By performing the first filtering process to Nall_R, the value of the reference data Nft_R continuously changes so as to follow the value of Nall_R accompanied by a response delay of a predetermined time constant.

Further, the second filtering processing at S104 is a low-pass characteristic filtering process having a higher cut-off frequency than the first filtering process, that is, a filtering process enabling frequency component in a higher frequency range than the first filtering process to pass. When such second filtering process is performed to Nall_R, the value of the reference data Nft_R continuously change so as to follow the value of Nall_R with a shorter time constant (a higher response speed) than the first filtering process.

Even in the case where either one of the first filtering process and the second filtering process is performed to Nall_R, the value of the reference data Nft_R finally converges to the same value as the value of Nall_R under the condition where the value of Nall_R is constant.

The processing of S105 through S108 for the left ground sensor group 22L is conducted exactly the same as in the processing of S101 through S104. By doing so, the reference data Nft_L for the left ground sensor group 22L is generated. In this instance, the frequency passing characteristic of the first filtering process in S107 is the same as the first filtering process in S103. Further, the frequency passing characteristic of the second filtering process in S108 is the same as the second filtering process in S104.

Figure 10:
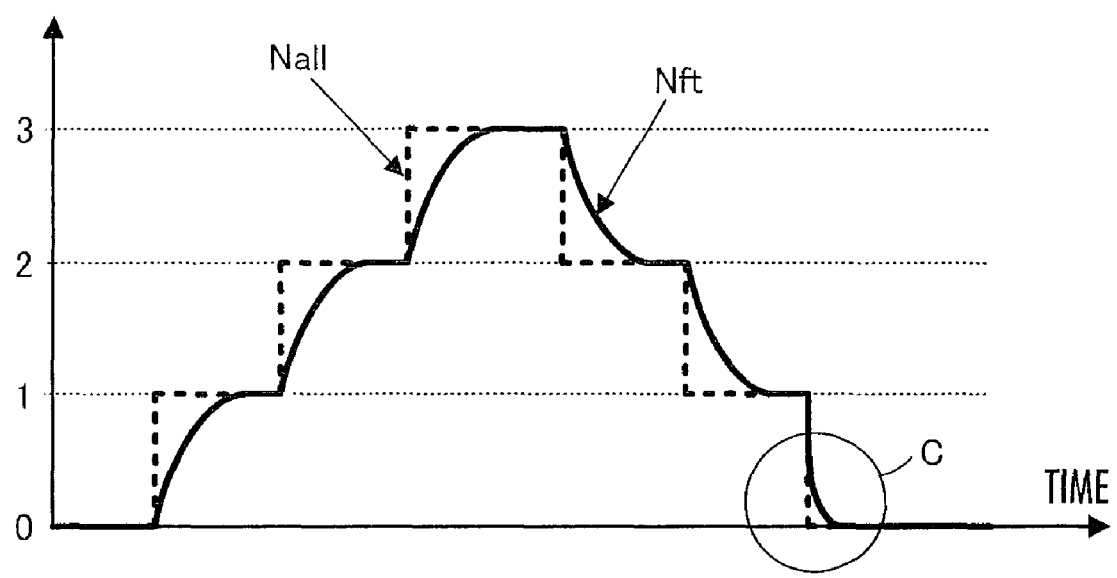
FIG. 10 is a graph showing an example of a temporal change of the reference data generated by the left/right desired share determining means in FIG. 7.

FIG. 10 shows a graph illustrating an example of a temporal change of the reference data Nft (Nft_R or Nft_L) generated as explained above, and a graph illustrating an example of a temporal change of the total number Nall which is a basis of the reference data Nft, in solid line and in broken line, respectively.

As seen in the figure, the value of the reference data Nft continuously change so as to follow the change of the value of Nall taking discrete value from zero to three, accompanied by a response delay of a time constant. In this case, the value of the reference data Nft follow the change of the value of Nall relatively moderately with a predetermined time constant, other than in the case where the value of Nall changes from a value other than zero to zero. This is because Nft is generated with the first filtering process in S103 or S107.

On the other hand, in the case where the value of Nall changes from a value other than zero to zero, the value of the reference data Nft follow the change of the value of Nall promptly with a shorter time constant (a higher response speed) than in other cases, as shown in a circle C in FIG. 10. This is because Nft is generated by the second filtering process in S104 or S108 from the time when the value of Nall becomes zero.

FIG. 10 shows an example where the value of Nall increases and decreases by one each. However, during actual walking of the user P, the value of Nall does not necessarily increase and decrease by one each. For example, there is a case where the value of Nall changes by two or more at the same time.

Supplementary, as is obvious, the value of the total number Nall for each of the ground sensor group 22 discretely increase and decrease according to the change of the total number of the ground sensor generating ground state output. Therefore, in the present embodiment, Nall corresponds to the first data of the present invention. Therefore, in this embodiment, the processing of S101 and S105 implements the first data generating means of the present invention. Further, the reference data Nft obtained by performing the first or the second filtering process for the value of Nall corresponds to the second data of the present invention. Therefore, in this embodiment, the filtering process in S103 and S104, and the filtering process in S107 and S108 correspond to the second data generating process of the present invention. Further, these filtering processes implements the second data generating means of the present invention. Still further, the processing of S102 and S106 implements the determining means of the present invention.

After generating the reference data Nft_R and Nft_L as explained above, the left/right desired share determining means 63 performs the processing of S109. This is a process for determining a right distribution ratio which is the ratio of the control desired value of the right leg link 3R to the desired value of the total lifting force (approximately equal to the assist device share supporting force) and a left distribution ratio which is the ratio of the control desired value of the left leg link 3L to the desired value of the total lifting force.

In this instance, the ratio of the value of Nft_R to the sum of the value of the reference data Nft_R of the right ground sensor group 22R and the value of the reference data Nft_L of the left ground sensor group 22L (=Nft_R/(Nft_R+Nft_L)), and the ratio of the value of the reference data Nft_L to the sum (=Nft_L/(Nft_R+Nft_L)) are determined as the right distribution ratio and the left distribution ratio, respectively. Therefore, the total sum of the right distribution ratio and the left distribution ratio is 1. Stated otherwise, the right distribution ratio and the left distribution ratio are determined according to the reference data Nft_R and Nft_L so that it satisfies: the right distribution ratio+the left distribution ratio=1; and the right distribution ratio/the left distribution ratio=Nft_R/Nft_L.

The right distribution ratio and the left distribution ratio correspond to the desired proportion of the present invention. The processing of S109 which determines whether the right distribution ratio and the left distribution ratio correspond to the desired proportion determining means of the present invention.

During normal walking of the user P, the mutual proportion of the total number Nall_R of the ground sensors generating ground state output in the right ground sensor group 22 and the total number Nall_L of the ground sensors generating ground state output in the left ground sensor group 22 basically reflect the mutual proportion of the treading force of each leg of the user P. For example, in the case where the treading force of the right leg of the user P is larger than the treading force of the left leg, the right total number Nall_R generally becomes larger than the left total number Nall_L. Further, as the treading force of the right foot increases and becomes even larger than the treading force of the left foot, the right total number Nall_R generally increases and becomes even larger than the left total number Nall_L. Still further, in the case where the treading force of the right leg and the treading force of the left leg are similar to each other, the right total number Nall_R and the left total number Nall_L often become nearly equal.

Therefore, the mutual proportion of the reference data Nft_R and Nft_L, the values respectively following the total number Nall_R and Nall_L, continuously change in a basically same manner as the mutual proportion of the treading force of the right leg and the treading force of the left leg of the user P.

Therefore, when the right distribution ratio and the left distribution ratio are determined as explained above, the proportion of the distribution ratios basically correspond to the proportion of the actual treading force of the right leg and the actual treading force of the left leg of the user P.

After determining the right distribution ratio and the left distribution ratio as described above, the left/right desired share determining means 63 respectively multiplies the right distribution ratio and the left distribution ratio to the desired value of the total lifting force, and determines a control desired value Fcmd_R which is a desired value of the total lifting force share of the right leg link 3R, and a control desired value Fcmd_L which is a desired value of the total lifting force share of the left leg link 3L, in S110.

The desired value of the total lifting force is preset as described below and stored in a memory, which is not shown, in this embodiment. For example, the left/right desired share determining means 63 obtains the magnitude of the gravity (the weight×gravitational acceleration) acting on the total weight of the entire weight of the walking assist device A (or the weight obtained by subtracting the total weight of the foot attachment portions 2 and 2 from the entire weight) plus a part of the weight of the user P to be supported by the lifting force acting on the user P from the seat member 1 (for example, the weight obtained by multiplying the entire weight of the user P by a preset ratio) and sets the magnitude of the gravity as the desired value of the total lifting force. In this case, consequently an upward translational force whose magnitude is equivalent to the gravity acting on a part of the weight of the user P is set as the desired lifting force from the seat member 1 to the user P.

Alternatively, it is possible to allow the magnitude of the desired lifting force applied from the seat member 1 to the user P to be directly set in the arithmetic processing unit 51. In addition, the arithmetic processing unit 51 may calculate the total sum of the desired lifting force and the magnitude of the gravity acting on the entire weight of the walking assist device A (or the weight of the entire weight minus the total weight of the foot attachment portions 2 and 2), as a desired value of the total lifting force. Moreover, if a vertical inertial force generated by the motion of the walking assist device A is large in comparison with the above gravity, the magnitude of the total sum of the inertial force and the foregoing gravity may be set as a desired value of the total lifting force. In this instance, it is necessary to estimate the inertial force sequentially. The estimation can be performed by a method described in Patent Document 2, for example.

The above is the processing of the left/right desired share determining means 63. With this processing, a set of the right control desired value Fcmd_R and the left control desired value Fcmd_L is determined so that the control desired values Fcmd_R and Fcmd_L are capable of applying the desired lifting force from the seat member 1 to the user P, and so that the mutual proportion (ratio) thereof coincide with the mutual proportion of the reference data Nft_R and Nft_L. In this case, the mutual proportion of the reference data Nft_R and Nft_L is, as is mentioned above, changes generally similar to the mutual proportion of the treading force of the right leg and the treading force of the left leg of the user P. Therefore, as a result, the mutual proportion of the control desired value Fcmd_R and Fcmd_L generally match with the proportion of the treading force of the right and left of the user P.

After the completion of processing of the left/right desired share determining means 63 as described above, the arithmetic processing unit 51 performs processing of the feedback manipulated variable determining means 64R and 64L, and the feedforward manipulated variable determining means 65R and 65L in series or in parallel. The algorithm of the processing is the same in either of the feedback manipulated variable determining means 64R and 64L. Further, the algorithm of the processing is the same in either of the feedforward manipulated variable determining means 65R and 65L. Therefore, the processing of the right feedback manipulated variable determining means 64R and the right feedforward manipulated variable determining means 65R will be typically described below. In the following description of the right feedback manipulated variable determining means 64R and the right feedforward manipulated variable determining means 65R, unless otherwise specified herein, the reference characters are assumed to relate to the right leg link 3R (the character "R" is omitted), as is in the explanation of the processing of the supporting force measuring means 62.

In the processing of the right feedback manipulated variable determining means 64, from a deviation ΔF of the control desired value Fcmd of the right leg link 3 determined by the left/right desired share determining means 63 and the measured value Fankle of the total lifting force share of the right leg link 3 measured by the right supporting force measuring means (=Fcmd−Fankle), the feedback manipulated variable Ifb as the feedback component of the indicator current value Icmd of the electric motor 15 is calculated by a predetermined feedback control law, for example a proportional-derivative (PD) law. That is, the feedback manipulated variable Ifb is calculated by adding up a value obtained by multiplying the deviation ΔF by a predetermined gain Kp (proportional term) and a derivative of multiplication between the deviation ΔF and a predetermined gain Kd (derivative term). In this embodiment, the sensitivity to change of the lifting force of the seat member 1 in response to change in current of the electric motor 15 (change in the output torque) varies according to the knee angle of the leg link 3. Therefore, in this embodiment, the right feedback manipulated variable determining means 64 variably sets the values of the gains Kp and Kd of the proportional term and the derivative term described above according to the measured value θ1 of the knee angle of the leg link 3 based on a predetermined data table which is not shown (a data table representing a relationship between the knee angle and the gains Kp and Kd).

The above is the processing of the right feedback manipulated variable determining means 64R. The processing of the left feedback manipulated variable determining means 64L is conducted similarly. The feedback control law used in each of the feedback manipulated variable determining means 64 may be a control other than the PD law (PID law or the like).

Thereafter, the right feedforward manipulated variable determining means 65 calculates a feedforward manipulated variable Iff as a feedforward component of the indicator current value of the electric motor 15 by the following model equation (4):

$$Iff = B1 \cdot Tcmd + B2 \cdot \omega1 + B3 \cdot sgn(\omega1) + B4 \cdot \beta1 \quad (4)$$

where Tcmd in the right-hand side of equation (4) is a desired value of the driving torque to be applied to the third joint 8 of the right leg link 3 by the driving force of the rotary actuator 9 (hereinafter referred to as a desired joint torque Tcmd), ω1 is a knee angular velocity as a time speed of change (derivative) of the knee angle of the right leg link 3, β1 is a knee angular acceleration as a time speed of change (derivative) of the knee angular velocity ω1, and sgn( ) is a sign function. Characters B1, B2, B3, and B4 denote coefficients of predetermined values.

The first term in the right-hand side of equation (4) represents a basic requested value of an applied current of the electric motor 15, which is requested to provide the third joint 8 of the right leg link 3 with a driving torque of the desired joint torque Tcmd. Further, the second term in the right-hand side represents a component of applied current of the electric motor 15, which is requested to drive the third joint 8 against a viscous resistance between the thigh frame 5 and the crus frame 7 at the third joint 8 of the right leg link 3, that is, a viscous resistance force between the thigh frame 5 and the crus frame 7 generated according to the knee angular velocity ω1. The third term in the right-hand side represents a component of applied current of the electric motor 15, which is requested to drive the third joint 8 against a dynamic frictional force between the thigh frame 5 and the crus frame 7 at the third joint 8 of the right leg link 3. Moreover, the fourth term in the right-hand side represents a component of applied current of the electric motor 15, which is requested to drive the third joint 8 against an inertial force moment generated according to the knee angular acceleration β1.

In this case, the right feedforward manipulated variable determining means 65 calculates the ω1 and β1 necessary for the calculation of the right-hand side of the equation (4) from the time series of the measured value θ1 of the knee angle of the right leg link 3 by the right knee angle measuring means 61. Further, the right feedforward manipulated variable determining means 65 calculates the desired joint torque Tcmd necessary for the calculation of the right-hand side of the equation (4) in the following manner.

That is, the right feedforward manipulated variable determining means 65 calculates the desired joint torque Tcmd from the angle θ2 (angle formed by the line segment S2 and line segment S3 in FIG. 7) which is calculated on the basis of the equations (2) and (3) from the measured value θ1 of the knee angle of the leg link 3 by the right knee angle measuring means 61, and the control desired value Fcmd of the right leg link 3 determined by the left/right desired share determining means 63, by the following equation (5).

$$Tcmd = (Fcmd \cdot \sin \theta2) \cdot L2 \quad (5)$$

The right-hand side of the equation (5) represents the moment acting on the third joint 8 of the right leg link 3 by the supporting force, in the case where the supporting force with a magnitude of the control desired value Fcmd is acting on the right leg link 3 from the floor side via the second joint 6. And, the driving torque balancing with the moment is obtained as the desired joint torque Tcmd.

In the processing of the right feedforward manipulated amount determining means 65, the values of the knee angular velocity ω1, the knee angular acceleration β1 and the desired joint torque Tcmd calculated as explained above is used to carry out the calculation of the right-hand side of the equation (4), and the feedforward manipulated variable Iff is calculated.

Additionally describing, the values of the coefficients B1, B2, B3, and B4 used for the calculation of equation (4) are previously identified on an experimental basis by an identification algorithm for minimizing a square value of a difference between the value of the left-hand side (actual measurement) and the value of the right-hand side (calculated value) of equation (4) and then stored in a memory which is not shown.

Further, the feedforward manipulated variable Iff may be determined by using a model equation in which any one of the term (for example, the fourth term) is omitted from the terms of the right-hand side of equation (4).

The details of the processing of the right feedforward manipulated variable determining means 65R has been described above. The same applies to the processing of the left feedforward manipulated variable determining means 65L.

With reference to FIG. 7, after calculating the manipulated variables Ifb_R and Iff_R of the current of the electric motor 15R and the manipulated variable Ifb_L and Iff_L of the current of the electric motor 15L, the arithmetic processing unit 51 adds the manipulated variables Ifb_R and Iff_R in the addition operation process 66R. By doing so, the arithmetic processing unit 51 determines the indicator current value Icmd_R of the electric motor 15R. Further, the arithmetic processing unit 51 adds the manipulated variables Ifb_L and Iff_L in the addition operation process 66L. By doing so, the arithmetic processing unit 51 determines the indicator current value Icmd_L of the electric motor 15L. Thereafter, the arithmetic processing unit 51 outputs the indicator current values Icmd_R and Icmd_L to the driver circuits 52R and 52L corresponding to the electric motors 15R and 15L, respectively. In this instance, each of the driver circuit 52 energizes each electric motor 15 in accordance with the given indicator current value Icmd.

The control processing of the arithmetic processing unit 51 described above is performed at predetermined control processing cycles. This causes the feedback control of the output torque of each electric motor 15 and consequently the driving torque applied to the third joint 8 of each leg link 3 so that the measured value Fankle of the total lifting force share of each leg link 3 coincides with (is converged to) the control desired value Fcmd corresponding to the leg link 3. As a result, the desired lifting force (the translational force capable of supporting a part of the weight of the user P) acts on the user P from the seat member 1, thereby reducing the load on the leg of the user P.

In this case, in the present embodiment, the force sensor for measuring the treading force itself of each leg of the user P is not provided, but the ground sensor group 22 comprised of a plurality of the ground sensors 22a, 22b, and 22c is provided to each foot attachment portion 2. From the output of the ground sensor group 22, the right distribution ratio and the left distribution ratio is determined as described above. By doing so, the mutual proportion of the control desired values Fcmd_R and Fcmd_L which are desired values of the supporting force to act on the leg links 3 respectively from the floor side to approximately match the mutual proportion of the actual treading force of each of the leg of the user P. Consequently, the mutual proportion of the supporting force actually acting on each of the leg links 3 from the floor side approximately match the mutual proportion of the actual treading force of each of the leg links 3 of the user P. Therefore, it is possible to control the mutual proportion of the supporting force actually acting on each of the leg links 3 from the floor side to the proportion enabling user P to smoothly carry out the motion of the leg, and to apply the desired supporting force to the user P from the seat member 1, using the ground sensors 22a, 22b, and 22c of a lower price than the force sensor. Further, the outputs of the ground sensors 22a, 22b, and 22c are binary outputs, so that the value of the total number Nall_R and Nall_L is less likely to generate an instantaneous fluctuation. Therefore, it is possible to restrict the instantaneous fluctuation of the value of the reference data Nft_R and Nft_L, and consequently the right distribution ratio and the left distribution ratio. As a result, it is possible to prevent the user P from feeling uncomfortable.

Further, in the case where the total number Nall of each of the ground sensor group 22 changes from value other than zero to zero, that is, in the case where the foot attachment portion 2 provided with the ground sensor group 22 leave the floor, the value of the reference data Nft promptly changes to zero. Therefore, the distribution ratio of the leg link 3 on the foot attachment portion 2 side becomes zero, and consequently the control desired value Fcmd thereof promptly becomes zero. As a result, it is possible to prevent the occurrence of a situation where, when the user P is going to lift one of the legs, the driving torque in the stretching direction is imparted to the third joint 8 of the leg link 3 on the lifted leg side, so that it becomes difficult to make the foot attachment portion 2 leave the floor. Therefore, it is possible to carry out leaving of the foot attachment portion 2 from the floor smoothly.

The following describes some variations of this embodiment.

In the above-described embodiment, the total number Nall itself of the ground sensors generating ground state output of each ground detecting means 22 is generated as the first data in the present invention. However, the value obtained by multiplying a predetermined gain to Nall, or a value obtained by adding a predetermined offset value to Nall may be generated as the first data of the present invention. Further, the reference data Nft may follow a value obtained by multiplying a predetermined gain to the value of the first data.

Here, for example, a value obtained by multiplying the above-mentioned total numbers Nall_R and Nall_L for each of the right ground detecting means 22R and the left ground detecting means 22L to the desired value of the total lifting force/(Nall_R+Nall_L) as the gain may be generated as the first data. In this case, the reference data obtained by providing filtering process to the first data for each of the ground detecting means 22 becomes the data defining the right distribution ratio and the left distribution ratio, as well as the data indicating the control desired values Fcmd_R and Fcmd_L which are the desired values of the supporting force to act on each of the right and left leg links 3R and 3L.

Further, with the increase and decrease of the total number Nall of the ground sensor generating ground state output of each ground detecting means 22, the total number of the ground sensor generating non-ground state output increase and decrease. Therefore, the total number of the ground sensor generating non-ground state output, or a value obtained by multiplying a predetermined gain thereto, or a value obtained by adding a predetermined offset value thereto may be generated as the first data. Still further, for example, in the case where the total number of the ground sensor generating non-ground state output in each ground detecting means 22 is generated as the first data, and the second data following the value of the first data accompanied by a response delay is generated as the reference data, the right distribution ratio and the left distribution ratio must be determined so that the magnitude relation of the right distribution ratio and the left distribution ratio becomes opposite to the magnitude relation of the value of the reference data in relation to the right ground detecting means 22R and the value of the reference data in relation to the left ground detecting means 22L. For example, when the value of the reference data in relation to the right ground detecting means 22R in this case is denoted by Nft_R', the value of the reference data in relation to the left ground detecting means 22L is denoted by Nft_L', and the total number of the ground sensor of each ground detecting means 22 is denoted by N, the right distribution ratio and the left distribution ratio should be determined so that it satisfies: the right distribution ratio+the left distribution ratio=1; and the right distribution ratio/the left distribution ratio=(N−Nft_R')/(N−Nft_L').

Further, in the above-mentioned embodiment, the first data and the reference data Nft are generated by software processing. However, the reference data Nft may be generated by an arithmetic and logical circuit or a hardware circuit including a filtering circuit.

Still further, in the above-mentioned embodiment, the reference data Nft is generated by the second filtering process, in the case where the total number Nall becomes zero in each ground detecting means 22. However, in the case where the total number Nall becomes zero, the value of Nail (or a value obtained by multiplying a predetermined gain thereto) may be generated as the value of Nft, by omitting the second filtering process. In this case, for example at S104 in FIG. 9, the value of Nall_R should be set as the value of Nft_R, and at S108 the value of Nall_L should be set as the value of Nft_L. By doing so, the embodiment of the fourth aspect of the present invention is established.

Still further, the number of ground sensors of each ground detecting means 22 is not limited to three, and for example may be equipped with more ground sensors. In the case where the number of the ground sensors are increased, the total number Nall of the ground sensor generating ground state output of each ground detecting means may be used as the reference data Nft to determine the right distribution ratio and the left distribution ratio. This is because, in the case where the number of the ground sensors of each ground detecting means is increased, the mutual proportion of the total number Nall_R in relation to the right ground detecting means 22 and the total number Nall_L in relation to the left ground detecting means 22 changes in a smaller step size, and the discrete change of the ratio, and consequently the proportion of the right distribution ratio and the left distribution ratio becomes minute.

Still further, the number of the ground sensors in each ground detecting means 22 may be smaller than three. For example, the number of the ground sensor of each ground detecting means 22 may be one. In this case, in order to continuously change the proportion of the right distribution ratio and the left distribution ratio, it is preferable to generate the reference data by generating the total number Nall of the ground sensor generating ground state output for each ground detecting means (=one or zero) as the first data, and then by providing a low-pass characteristic filtering process to the first data, for example. Alternatively, the right distribution ratio and the left distribution ratio may be determined by using the total number Nall of the ground sensor generating ground state output for each ground detecting means (=one or zero) itself as the reference data.

Still further, in the above-mentioned embodiment, the low-pass characteristic filtering process is used as the second data generating process of the present invention. However, the second data (the reference data) following the value of the first data (or the value obtained by multiplying a predetermined gain thereto) accompanied by a response delay may be generated by a process other than the filtering process. For example, in the case where the total number Nall of the ground sensor generating the ground state output for each ground detecting means is generated as the first data, when the value of the first data Nall changes, the value of the second data (the reference data) Nft may be changed at a predetermined constant speed of change (speed of change with time), as is indicated by a solid line in FIG. 11(*a*), in the direction of the value of the first data Nall after the change (indicated by a broken line). In this case, the speed of change takes a positive value when the value of the first data Nall is increasing, and takes a negative value when the value of the first data Nall is decreasing. Further, the degree of the speed of change of the value of the reference data Nft in the case where the value of the first data Nall changes from a value other than zero to zero is larger than in other cases.

Figure 11A:
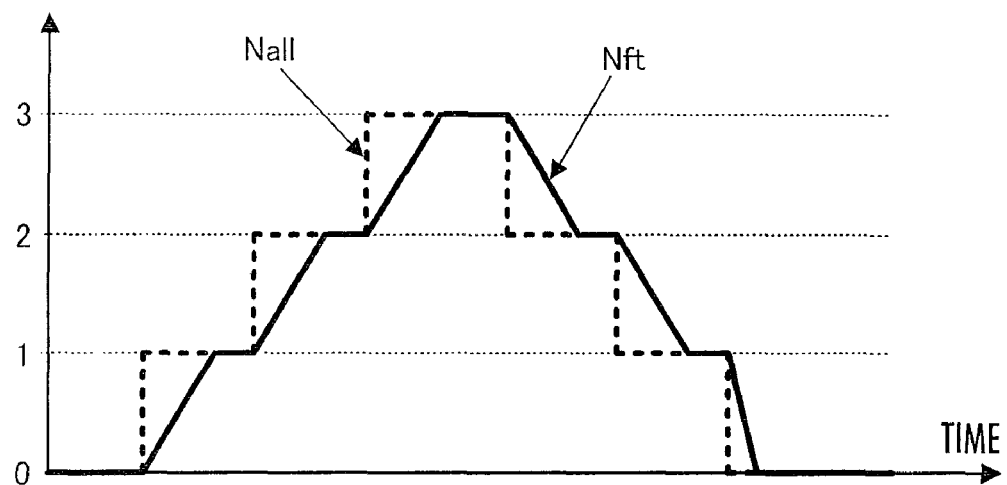
FIG. 11(a) and (b) are graphs respectively showing examples of a temporal change of the reference data generated by the left/right desired share determining means.
Figure 11B:
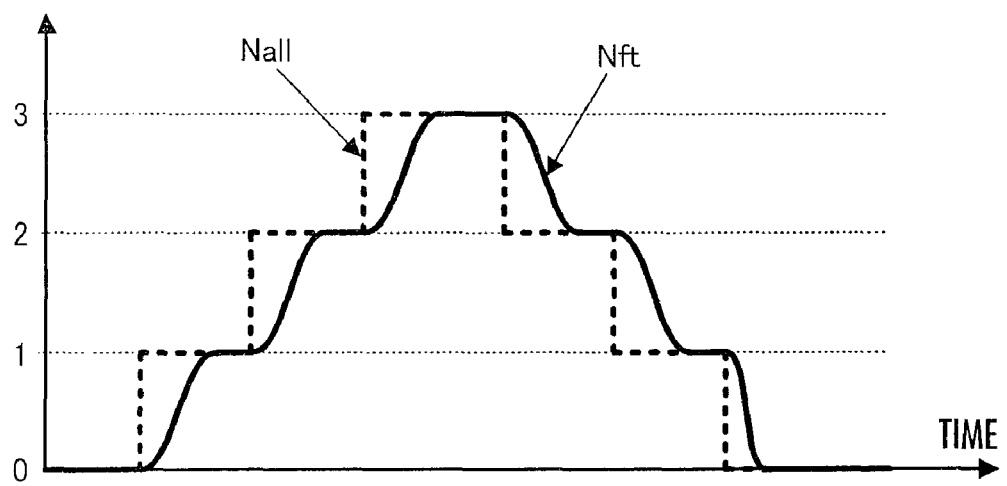

Still further, when the value of the first data Nall changes, the value of the second data (the reference data) Nft may be changed in a curved manner (in a manner where the speed of change of the value Nft changes over time), as is indicated by a solid line in FIG. 11(*b*), in the direction of the value of the first data Nall after the change (indicated by a broken line). In the example shown in FIG. 11(*b*), the speed of change of the value of Nft takes a positive value when the value of the first data Nall is increasing, and takes a negative value when the value of the first data Nall is decreasing. And, the degree of the speed of change gradually increases immediately after the change of the value of the first data Nall. Thereafter, the degree of the speed of change of the value Nft gradually decreases as the value of Nft draws close to the value of the first data Nall after change. Further, the degree of the average speed of change of the value of reference data Nft in the case where the value of the first data Nall changes from a value other than zero to zero is larger than in other cases.

As such, the changing pattern of the value of the reference data Nft in response to the change of the value of the first data Nall may take various patterns.

Moreover, although it is not equipped in the walking assist device of the above-mentioned embodiment, a spring for biasing the third joint 8 of each leg link of the walking assist device A in the stretching direction of the leg link 3 may be provided, in order to reduce the load of each rotary actuator 9 (reduce the necessary maximum output torque). In the case where such spring is provided, and when biasing the leg link 3 in the stretching direction thereof, the driving torque to be applied to the third joint 8 from the electric motor 15, and consequently the desired torque of the electric motor 15 is decreased by the amount of torque generated at the third joint 8 by the spring. The torque generated by the spring at the third joint 8 varies according to the knee angle of the leg link 3. Therefore, in the processing of the feedforward manipulated variable determining means 65, the feedforward manipulated variable Iff may be determined by an equation in which a term in proportion to the knee angle θ1 of each leg link 3, that is, a term for decreasing the current of the electric motor 15 which generates the driving torque in the stretching direction of the leg link 3 by a current corresponding to the magnitude of the torque generated at the third joint 8 by the spring, is added to the right-hand side of the equation (4).

Still further, the actuator for driving the third joint 8 of each leg link 3 is not limited to the rotary actuator. For example, the actuator may be configured from an actuator of a linear motion type (for example, a fluid pressure cylinder in which a piston rod is pivotally attached to one of the thigh frame 5 and the crus frame 7, and a cylinder tube is pivotally attached to the other).

Moreover, in the case where the usage pattern of the walking assist device A is limited to a relatively slow motion of the legs of the user P, each feedforward manipulated variable determining means 65 may be omitted. In this case, for example, the indicator current value Icmd of each electric motor 15 may be determined according to the feedback control law such as the PID law on the basis of the deviation ΔF between the control desired value Fcmd and the measured value Fankle of the total lifting force share.

What is claimed:

1. A control device for a walking assist device, in which the walking assist device comprises: a lifting force transmitting portion adapted to be put in contact with a trunk of a user so as to allow an upward lifting force to be applied to the trunk of the user; a pair of left and right foot attachment portions adapted to be fitted to feet of legs of the user; a pair of left and right leg links connecting the foot attachment portions to the lifting force transmitting portion, respectively, each of the leg links including a thigh frame extending from the lifting force transmitting portion via a first joint, a crus frame extending from each foot attachment portion via a second joint, and a third joint that interconnects the thigh frame and the crus frame so that the frames freely bend and stretch; and an actuator for driving the third joint of each leg link, the control device comprising:

a desired proportion determining means which sequentially determines a mutual desired proportion of a supporting force to be applied to each of the leg links of the walking assist device from a floor side, wherein the control device controls a driving force of the actuator of the walking assist device to apply a desired lifting force from the lifting force transmitting portion to the trunk of the user, and so as to make a mutual proportion of the supporting force actually applied to each leg link of the walking assist device from the floor side to become the desired proportion determined by the desired proportion determining means;

a ground detecting means comprising one or more ground sensors, the ground sensors being arranged on each foot attachment portion of the walking assist device so as to be opposed to one or more locations in a bottom surface of the foot of each leg of the user, and which selectively generates a ground state output and a non-ground state output, which is a binary output in accordance with whether or not the foot attachment portion of the walking assist device is grounded at a position immediately below each of the arranged locations; and a reference data generating means which sequentially generates a reference data for each ground detecting means on the basis of the output of the ground sensors of each ground detecting means, in which the value of the reference data increases and decreases in accordance with a change of a total number of the ground sensors generating the ground state output in each ground detecting means;

wherein the desired proportion determining means is a means which determines the desired proportion in accordance with a mutual proportion of the values of the reference data for each ground detecting means generated by the reference data generating means.

2. The control device according to claim 1, wherein the reference data generating means comprises a first data generating means which sequentially generates a first data for each ground detecting means, in which a value of the first data discretely increases and decreases in accordance with the change of the total number of the ground sensors generating ground state output in each ground detecting means, and a second data generating means which executes a second data generating process which is a process for generating a second data from the first data of each ground detecting means generated by the first data generating means, in which a value of the second data continuously changes so as to follow, accompanied by a response delay, a value of the first data or a value obtained by multiplying a predetermined gain to the value of the first data, and which obtains the second data generated by the second data generating process as the reference data.

3. The control device according to claim 2, comprising a judgment means which sequentially judges whether or not the total number of the ground sensors generating the ground state output is zero or not, for each ground detecting means, based on the ground state and non-ground state output from the ground sensors, wherein the second data generating process executed by the second data generating means is a process for increasing a response speed of change of the value of the second data with respect to the change of the value of the first data in the case where a judgment result of the judgment means is positive, than in a case where the judgment result is negative.

4. The control device according to claim 2, comprising a judgment means which sequentially judges whether or not the total number of the ground sensors generating the ground state output is zero or not, for each ground detecting means, based on the ground state and non-ground state output from the ground sensors, wherein the second data generating means generates as the second data the value of the first data or a value obtained by multiplying the predetermined gain to the value of the first data, by omitting an execution of the second data generating process, in a case where a judgment result of the judgment means is positive.

* * * * *